US008529050B2

(12) United States Patent
Vandermeulen

(10) Patent No.: US 8,529,050 B2
(45) Date of Patent: Sep. 10, 2013

(54) PRINTING DEVICE AND CASSETTE

(75) Inventor: Kris Vandermeulen, Bornem (BE)

(73) Assignee: Dymo, Sint-Niklaas (BE)

( * ) Notice: Subject to any disclaimer, the term of this patent is extended or adjusted under 35 U.S.C. 154(b) by 1521 days.

(21) Appl. No.: 10/540,541

(22) PCT Filed: Dec. 23, 2003

(86) PCT No.: PCT/EP03/14990

§ 371 (c)(1),
(2), (4) Date: Sep. 28, 2006

(87) PCT Pub. No.: WO2004/059241

PCT Pub. Date: Jul. 15, 2004

(65) Prior Publication Data

US 2007/0009302 A1 Jan. 11, 2007

(30) Foreign Application Priority Data

Dec. 24, 2002 (GB) .................................. 0230196.8
Dec. 24, 2002 (GB) .................................. 0230199.2
Dec. 24, 2002 (GB) .................................. 0230200.8

(51) Int. Cl.
*B41J 2/01* (2006.01)
*B41J 32/00* (2006.01)
*G03B 23/02* (2006.01)
*G11B 23/107* (2006.01)

(52) U.S. Cl.
USPC ............................ 347/101; 347/214; 242/348

(58) Field of Classification Search
USPC ................... 242/348, 348.1, 348.2, 347, 341, 242/342, 345.2, 345, 345.1; 347/101, 104, 347/214, 215, 218
See application file for complete search history.

(56) References Cited

U.S. PATENT DOCUMENTS 2,153,573 A * 4/1939 Kinloch ..................... 242/348.4
3,009,618 A * 11/1961 Lerner .......................... 226/162
3,394,901 A * 7/1968 Bunting ...................... 242/338.4
3,547,373 A * 12/1970 Bundschuh ................ 242/338.4
3,643,777 A * 2/1972 Anderson et al. ............. 400/208

(Continued)

FOREIGN PATENT DOCUMENTS

EP 0 267 890 11/1987
EP 0 322 918 B1 4/1992

(Continued)

OTHER PUBLICATIONS

Translation of Chinese Office Action for Application No. 200380109256.6, dated Sep. 28, 2007.

(Continued)

*Primary Examiner* — Stephen Meier
*Assistant Examiner* — Leonard S Liang
(74) *Attorney, Agent, or Firm* — Marshall, Gerstein & Borun LLP

(57) ABSTRACT

The present invention relates to a cassette for a recording medium, comprising an upper casing and a lower casing, a spool for holding a roll of recording medium and disposed the upper and lower casings, and a side casing for enclosing the spool and joining the upper and lower casings, wherein the side casing is fitted to at least one of the upper and lower casings by means of press fit or snap-fit connections. Various embodiments of cassettes and printers are also disclosed.

7 Claims, 32 Drawing Sheets

(56) References Cited

U.S. PATENT DOCUMENTS 3,938,752 A * 2/1976 Mann et al. .................. 242/326
3,945,584 A * 3/1976 Mangan .................... 242/348.4
4,402,619 A 9/1983 Paque et al.
4,420,762 A * 12/1983 Andrews ...................... 346/136
4,586,803 A * 5/1986 Moss et al. .................. 396/601
4,744,527 A * 5/1988 Coote et al. ............... 242/348.4
4,756,418 A * 7/1988 Johanson et al. ............ 242/539
4,822,189 A * 4/1989 Dobring et al. .............. 400/208
4,878,581 A 11/1989 Beery
4,903,833 A 2/1990 Beery
4,903,835 A 2/1990 Beery
4,927,278 A 5/1990 Kazuya et al.
4,966,476 A 10/1990 Kazuya et al.
4,971,462 A * 11/1990 Mueller et al. ............... 400/208
4,978,240 A * 12/1990 Katsuno .................... 400/224.2
4,986,678 A * 1/1991 Hwang ........................ 400/208
5,174,519 A * 12/1992 Oi et al. .................... 242/348.2
5,215,273 A * 6/1993 Greene ........................ 242/550
5,251,839 A * 10/1993 Zander et al. ................ 242/348
5,255,039 A * 10/1993 Miller .......................... 396/515
5,261,623 A 11/1993 Dominesey et al.
5,275,346 A 1/1994 Dominesey et al.
5,295,634 A * 3/1994 Zander et al. ................ 242/348
5,393,149 A * 2/1995 Iima ............................. 400/208
5,492,282 A * 2/1996 Okuchi et al. ............... 242/341
5,522,563 A * 6/1996 Earnhart et al. ............. 242/348
5,581,320 A * 12/1996 Manico et al. ............... 396/515
5,613,787 A 3/1997 Passer et al.
5,618,118 A 4/1997 Matsumoto et al.
5,620,265 A * 4/1997 Kondo ......................... 400/196
5,730,536 A * 3/1998 Yamaguchi ............... 400/615.2
5,812,884 A * 9/1998 Sangregory ....................... 396/6
5,853,254 A * 12/1998 Inakoshi et al. ............. 400/207
5,921,494 A * 7/1999 Schulz et al. ................ 242/348
5,949,527 A * 9/1999 Yamamoto ...................... 355/75
6,099,179 A 8/2000 Higashi et al.
6,132,120 A 10/2000 Yamaguchi et al.
6,172,845 B1 * 1/2001 Tatehata et al. ............ 360/99.02
6,257,780 B1 7/2001 Ito et al.
6,367,995 B1 4/2002 Hashimoto et al.
6,435,744 B1 8/2002 Dunn et al.
6,812,943 B1 * 11/2004 Day et al. ...................... 347/171
6,955,318 B2 * 10/2005 Nonomura .................... 242/344
2002/0186994 A1 12/2002 Ito
2002/0186995 A1 12/2002 Iosilevich
2003/0146329 A1 * 8/2003 Hiraguchi .................. 242/348.2
2004/0031875 A1 2/2004 Nonomura
2004/0056143 A1 3/2004 Nonomura

FOREIGN PATENT DOCUMENTS

EP 0 322 919 B1 4/1992
EP 0 578 372 B1 9/1996
EP 1 336 507 A1 8/2003
JP 61-200846 12/1986
JP 2-210436 8/1990
JP 06040130 A * 2/1994
JP 06064270 A * 3/1994
JP 6-95304 4/1994
JP 06122241 A * 5/1994
JP 06238977 A * 8/1994
JP 11-116108 4/1999
JP 2001-100598 A 4/2001
WO WO 02/32680 A1 4/2002

OTHER PUBLICATIONS

Translation of Russian Official Action for Application No. 0510423/40.
International Search Report, dated May 26, 2004.
Translation of Notice of Reason for Rejection for corresponding Japanese Patent Application No. 2004-563225, dated Aug. 4, 2008.
International Search Report for Application No. PCT/EP03/14990, dated Sep. 30, 2004.

* cited by examiner

FIG. 11g
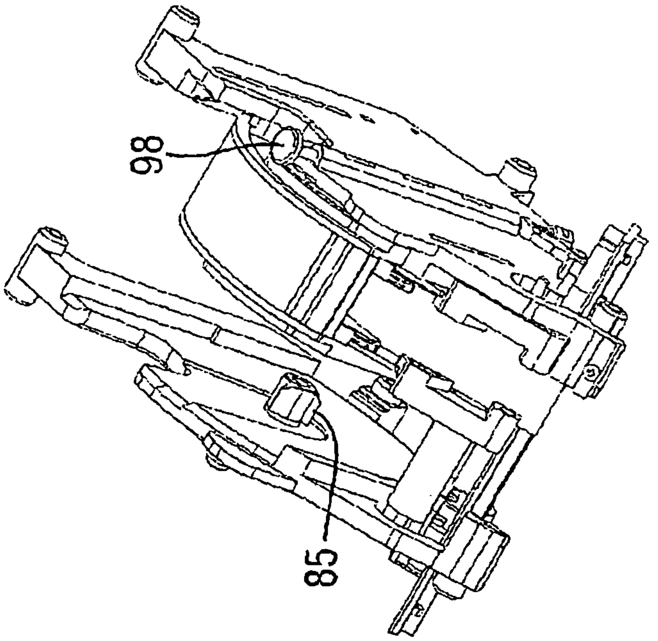
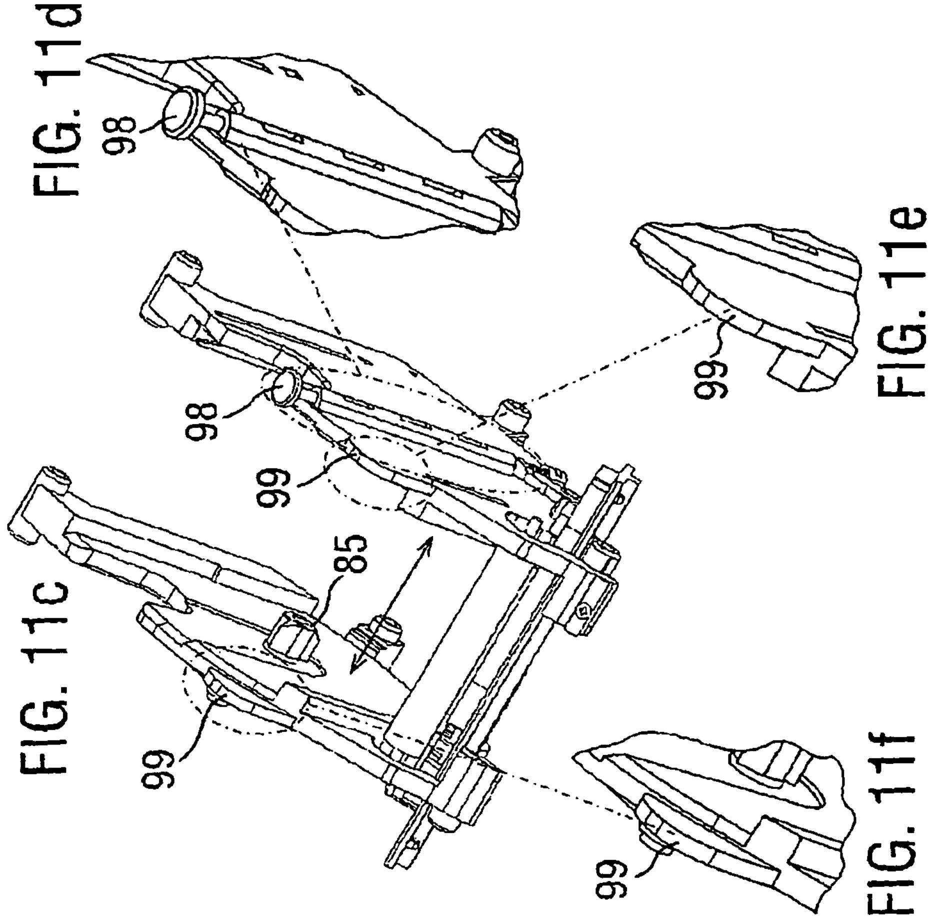
FIG. 11c
FIG. 11d
FIG. 11e
FIG. 11f

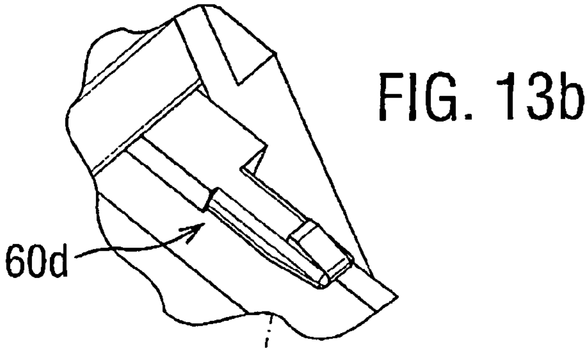
FIG. 13b
FIG. 13a
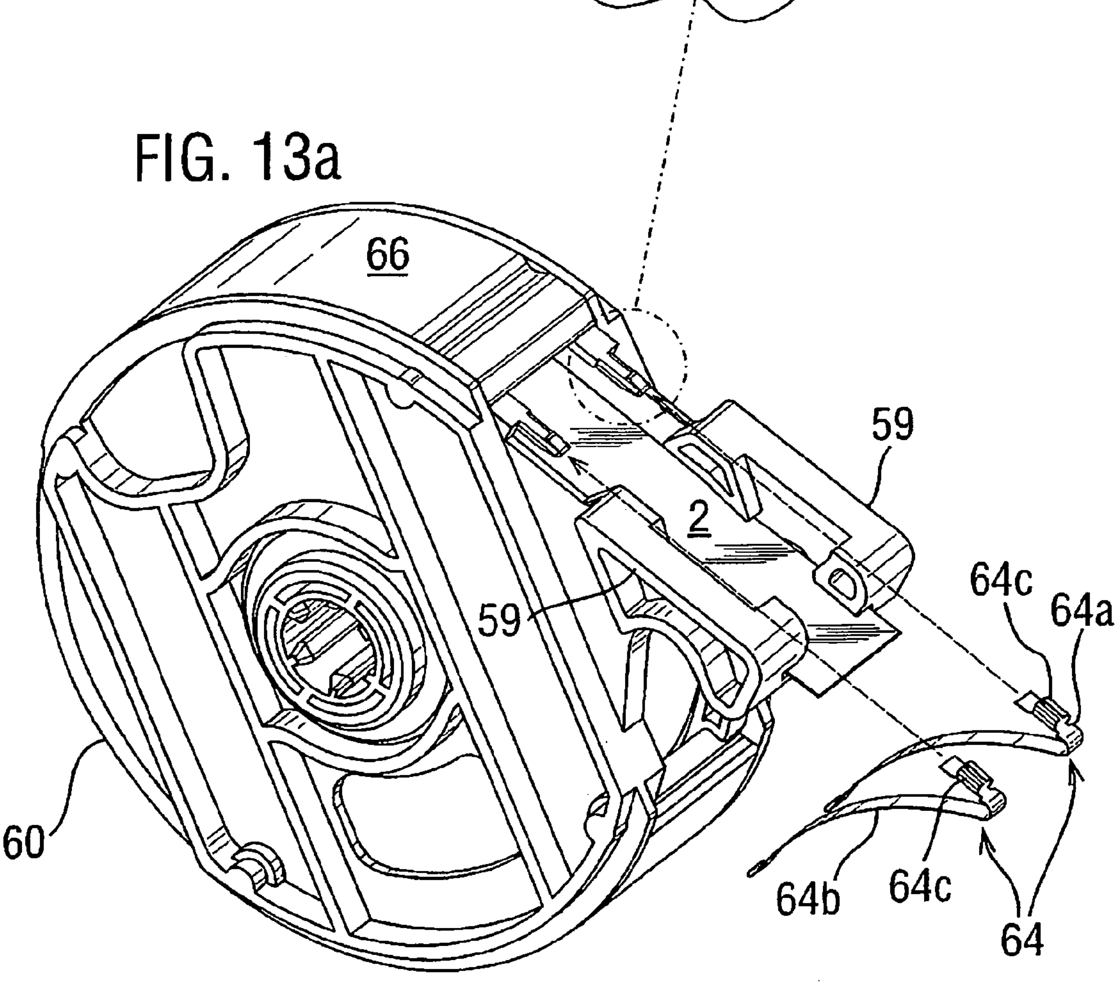

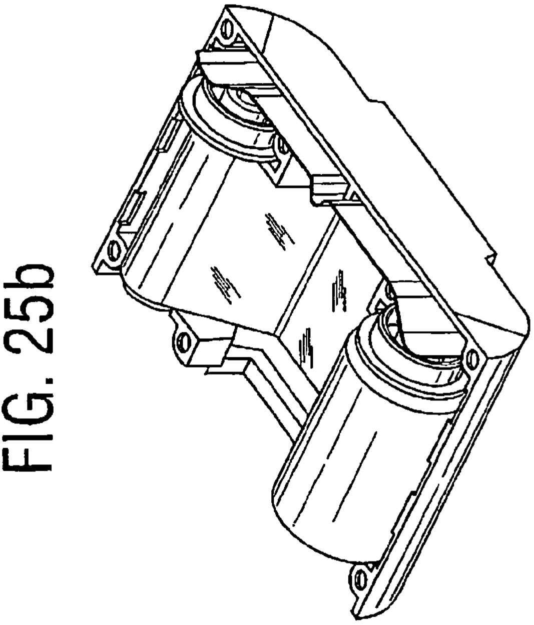
FIG. 25b
FIG. 25a
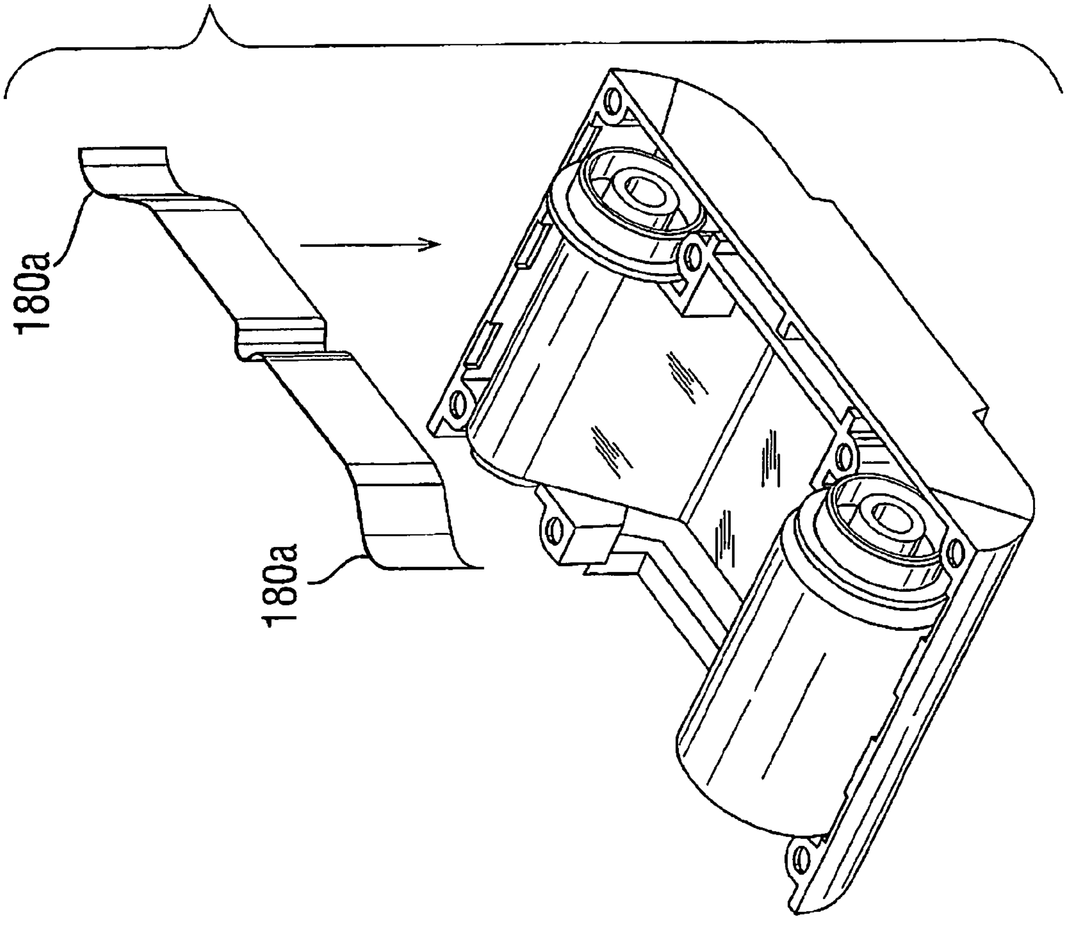

PRINTING DEVICE AND CASSETTE

CROSS REFERENCE TO RELATED APPLICATIONS

This is the U.S. National Stage of PCT/EP2003/014990, filed Dec. 23, 2003, which in turn claims priority to European Patent Application No. 0230199.2, 0230200.8, and 0230196.8, all filed Dec. 24, 2002, all four of which are incorporated herein by reference in their entireties.

FIELD OF THE INVENTION

The present invention relates to a printing device and a cassette or cartridge, and also to a combination of a printing device and such a cassette or cartridge.

BACKGROUND

One type of printing device that is widely known is a thermal tape printer. A thermal tape printer generally comprises a printing means comprising a thermally activatable printhead for printing onto an image receiving tape. Typically, the image receiving tape has an upper layer for receiving an image and a removable liner layer or backing layer secured to the upper layer by a layer of adhesive, such that after an image has been printed the liner layer or backing layer can be removed and the image receiving tape can be stuck down in the form of a label. Such thermal printers often include cutters for cutting off a length of image receiving tape after the image has been printed. Such thermal printers operate with a consumable in the form of image receiving tape, or any other image receiving substrate such as heat shrink tube, magnetic, iron-on labels, plastic strips, etc. The term “consumable” is used herein to denote any appropriate form of providing image receiving tape. The image receiving tape may comprise a continuous backing sheet whilst the image receiving layer has been pre-cut into labels, such that a label can be printed and then peeled off from the backing sheet. A printer intended to operate with such an image receiving tape does not need a cutter to cut the image receiving tape.

A number of forms of consumables are known in the art, including cassettes or cartridges which comprise a housing in which is located a supply of image receiving tape. Cassettes are generally usable once only, such that once the image receiving tape has been consumed, the cassette (including the housing) is thrown away.

A cassette can have a housing which substantially encloses the supply of image receiving tape or the housing can be simpler, for example a spool and two sides within which the tape is located. A simpler cassette is sometimes called an image receiving holder.

Another type of consumable is a roll of tape without a permanent holder, for example wound on a paper core. These are termed “supplies”.

In thermal printers, an image is generally generated by activation of a thermal printhead against an ink ribbon, such that ink from the ink ribbon is transferred onto the image receiving tape at a print zone. So-called direct thermal tapes are also available, in which an image is created directly onto the direct thermal tape without the interposition of an ink ribbon. If an ink ribbon is used in a thermal printer, it is generally provided held in a cassette having a housing, the housing being insertable into the printer. The ink ribbon is passed out of the cassette into overlap with the image receiving tape such that both the ink ribbon and the image receiving tape are fed past the printhead. Each length of ink ribbon is used for only one printing operation and is then rewound back into the ink ribbon cassette. The ink ribbon is therefore also a consumable.

Known tape printing apparatus of the type with which the present invention is concerned are disclosed in EP-A-322918 and EP-A-322919 (Brother Kogyo Kabushiki Kaisha) and EP-A-267890 (Varitronic). The printers each include a printing device having a cassette receiving bay for receiving a cassette or tape holder. In EP-A-267890, the tape holder houses an ink ribbon and a substrate tape, the latter comprising an upper image receiving layer secured to a backing layer by an adhesive. In EP-A-322918 and EP-A-322919, the tape holding case houses an ink ribbon, a transparent image receiving tape and a double sided adhesive tape which is secured at one of its adhesive coated sides to the image tape after printing and which has a backing layer peelable from its other adhesive coated side. With both these apparatus, the image transfer medium (ink ribbon) and the image receiving tape (substrate) are in the same cartridge.

It has also been proposed by the present applicants in, for example, EP-A-578372 to house the ink ribbon and the substrate tape in separate cassettes or cartridges.

In all of these cases, the image receiving tape passes in overlap with the ink ribbon to a print zone consisting of a fixed print head and a platen against which the print head can be pressed to cause an image to transfer from the ink ribbon to the image receiving tape. There are many ways of doing this, including dry lettering or dry film impression, but the most usual way currently is by thermal printing where the print head is heated and the heat causes ink from the ink ribbon to be transferred to the image receiving tape.

The devices of the type described above are provided with a keyboard which enables a user to enter characters, symbols and the like to form an image to be printed by the tape printer. The keyboard usually has text character keys and number keys for entering letters and number keys respectively, plus some function keys which, among other things, operate menus and allow printing attributes to be set.

Cassettes are usually made from plastics material and for practical purposes are often formed from more than one moulded part. One problem with such cassettes is that they can be costly to manufacture because each moulded part is relatively complex in order to achieve correct placement and unwinding of the image receiving medium, and the parts need to be fitted together by a manufacturing process e.g. welding. It would be desirable to provide a cassette made from parts which can be press-fit or snap-fit together.

Another problem with such cassettes is that excessive unwinding of the tape from the cassette can occur, and this is undesirable. This can happen during transportation of the cassette, but can also occur during operation of the printer when the tape is being driven. It would be desirable to provide a cassette with means for preventing excessive unwinding of the tape.

During use of a cassette, image receiving tape contained therein must be unwound and must exit the cassette in order to be printed on. It is vital that the tape is properly aligned in the correct position relative to the printhead and, if used, the ink ribbon. Although this may be in part achieved by guiding elements within the printer, these may not be able to achieve accurate alignment if the tape is not correctly aligned when it arrives at the guiding elements. One problem with existing cassettes is that it is possible for the image receiving tape to move laterally during unwinding and exit from the cassette, and if enough lateral movement is accumulated over the unwinding and exit path, the image is not printed centrally on the tape or, in the worst case, does not even fit on the tape due to being printed in the wrong position or due to folds in the tape. It would therefore be desirable to provide a cassette which has means for ensuring correct alignment of exiting image receiving tape.

A printer of the type previously described is often useable with different widths of tape. This enables the creation of many different sizes of labels. It is usual to size a cassette housing to correspond to the width of the tape contained in the cassette, thereby giving a visual indication of the tape size and avoiding use of unnecessarily bulky cassette housings. Having a suitably sized casing may also make it easier for tape to exit the cassette correctly aligned, depending on the design of the cassette and printer. One problem associated with the provision of multiple cassettes is the manufacturing cost for making the various designs. It would be desirable to mitigate these costs.

As well has having different cassettes of different tape width available, it is also common to provide various cassettes of different colours and styles of tape. Another consequence of having different cassettes available for use with a printer is that a user or multiple users will want to use different cassettes but not use all the tape on one cassette at once. Therefore, one cassette will be removed by a user and another inserted. A problem associated with this is wastage of tape. This occurs because after creation of a label, a certain amount of further tape has exited from the cassette and is in the region between the cassette and the printer tape exit. It would be desirable to rewind this further tape prior to removal of a cassette so that it is available for use the next time the cassette is inserted into the printer.

In order to achieve successful printing the image receiving cassette must be held firmly in place in the printer and must be inserted in the correct location. If the cassette can move about within the printer or is incorrectly positioned during insertion, images will not be correctly printed on the tape, or malfunction of the printer could be caused. It would therefore be desirable to provide means for ensuring accurate alignment and positioning of a cassette in a printer and means for retaining the cassette in the correct position after insertion.

Most printers include a drive means which rotates a supply spool of a tape cassette, thus feeding tape to the printing area. It may be desirable to provide a further means of locally feeding the tape in the printing area.

Another requirement for successful printing is that the ink ribbon cassette is correctly inserted in the printer and is retained in the correct location. If the ribbon cassette can move about within the printer it may result in incorrect feeding of the ink ribbon and hence a lack of proper transfer of ink to the image receiving tape during printing. It would therefore be desirable to facilitate correct insertion of the ink ribbon cassette and to ensure retention of the ink ribbon cassette in the correct position in the printer.

SUMMARY OF THE INVENTION

According to a first aspect of the present invention, there is provided a cassette for a recording medium, comprising an upper casing and a lower casing, a spool for holding a roll of recording medium and disposed between the upper and lower casings, and a side casing for enclosing the spool and joining the upper and lower casings, wherein the side casing is fitted to at least one of the upper and lower casings by means of press-fit or snap-fit connections.

According to a second aspect of the present invention, there is provided a cassette for a recording medium comprising an exit region for recording medium, and first and second flanges disposed at the exit region, each flange comprising one or more grooves adapted to receive an edge of a recording medium and allow the said edge to pass along the grooves.

According to a third aspect of the present invention, there is provided a cassette for a recording medium comprising a casing, wherein one region of the casing has a rib on its exterior surface, which rib is adapted to slide in a groove of a device in which the cassette can be inserted, the rib comprising a projection adapted to latch into a detent of a device in which the cassette can be inserted.

According to a fourth aspect of the present invention, there is provided a printing device having a recording medium receiving bay adapted to receive a recording medium cassette, wherein the receiving bay comprises a groove along which a rib of a recording medium cassette can be slid during insertion of the cassette into the recording medium receiving bay, the groove comprising a detent into which a projection of a rib of a recording medium cassette can be latched.

According to a fifth aspect of the present invention, there is provided a printing device having a recording medium receiving bay adapted to receive a recording medium cassette, the receiving bay comprising first and second supports mounted in a moveably resiliently manner, the printing device further comprising a mechanism which is operable to allow separation of the supports for insertion of a recording medium cassette therebetween and is further operable to allow movement of the supports towards one another to retain an inserted recording medium cassette in a substantially fixed position with respect to the recording medium receiving bay.

According to a sixth aspect of the present invention, there is provided a cassette adapted to be received in a printing device, the cassette comprising one of a ramp means and a resiliently moveable portion capable of interacting with the other of a ramp means and a resiliently moveable portion of a printing device, such that during insertion of the cassette the ramp means causes movement of the resiliently moveable portion from a position in which it would otherwise prevent insertion of the cassette into a position allowing insertion of the cassette.

According to a seventh aspect of the present invention, there is provided in combination a printing device and a cassette adapted to be received in the printing device, the printing device comprising a resiliently moveable portion capable of interacting with a ramp means of a cassette, such that during insertion of the cassette the ramp means causes movement of the resiliently moveable portion from a position in which it would otherwise prevent insertion of the cassette into a position allowing insertion of the cassette.

According to an eighth aspect of the present invention, there is provided a cassette comprising a hollow spool for holding a recording medium, and a sprocket disposed inside at least a part of the spool and driveable to rotate the spool for unwinding recording medium therefrom, wherein a surface of the sprocket in contact with an interior surface of the spool comprises a plurality of protrusions which bear on the inside surface of the spool.

According to a ninth aspect of the present invention, there is provided a printer comprising a cassette receiving bay for receiving a cassette holding recording medium, the cassette receiving bay comprising a sprung portion which is openable to allow insertion of a cassette in the receiving bay and which is arranged to, following insertion of a cassette, close under a spring force, thereby locking an inserted cassette in the receiving bay.

According to a tenth aspect of the present invention, there is provided a cassette for use with a printer, the cassette comprising one or more ribs on an outside surface of the cassette, at least one of the ribs being substantially channel-shaped, wherein at least one of the legs of the channel-shape is disposed at an angle of greater than 90° to the base of the channel-shape.

According to an eleventh aspect of the present invention, there is provided a in combination a printer and a cassette, the printer comprising a cassette receiving bay for receiving the cassette, the cassette receiving bay comprising a fixed portion and a sprung portion which is openable to allow insertion of the cassette in the receiving bay and which is arranged to, following insertion of the cassette, close under a spring force, thereby locking the inserted cassette in the receiving bay, wherein when the sprung portion is open, the sprung portion and the fixed portion together form one or more grooves through which a corresponding one or more ribs of the cassette can slide during insertion, thereby retaining the sprung portion in an open position during insertion.

According to a twelfth aspect of the present invention, there is provided a recording medium cassette comprising a casing and having a wound roll of recording medium disposed in the casing which roll can unwind such that an end of the recording medium can exit the casing, wherein the cassette further comprises a leaf spring disposed on the casing and oriented to act on the recording medium to exert a force in a direction towards the centre of the roll of recording medium.

According to a thirteenth aspect of the present invention, there is provided a set of cassettes for holding a recording medium, each cassette comprising an upper portion and a lower portion disposed apart a distance and joined together by attachment to a side portion having a width corresponding to the distance, thereby enabling a roll of recording medium to be held between the upper and lower portions with the width of the recording medium being oriented substantially parallel to the width of the side portion, wherein each cassette has a side portion of a different width.

According to a fourteenth aspect of the present invention, there is provided a printer for use with a cassette holding recording medium, the printer comprising: driving means able to drive in a forward direction to unwind recording medium of a cassette inserted in the printer and to drive in a reverse direction for rewinding recording medium; detection means for detecting that an inserted cassette is to be removed from the printer and, when such a detection is made, generating a signal indicating that a cassette is to be removed, wherein the driving means is arranged to receive the generated signal and in response thereto, drive in the reverse direction for rewinding a length of recording medium of an inserted cassette.

According to a fifteenth aspect of the present invention, there is provided a printer for use with a cassette holding recording medium, the printer comprising: a printing zone comprising a platen and a print means arranged to receive therebetween recording medium held in a cassette inserted in the printer, to thereby print an image on a length of the recording medium, the platen being rotatable to drive a length of recording medium through the printing zone; and driving means comprising a feed roller arranged to rotate to thereby unwind recording medium held in an inserted cassette to thereby feed recording medium to the printing zone, wherein the printer is arranged to, when a length of recording medium unwound by the driving means reaches the printing zone, rotate the platen to drive the length of recording medium through the printing zone.

According to a sixteenth aspect of the present invention, there is provided a printer comprising: a cassette receiving bay for receiving a cassette holding recording medium; a roller drive means disposed in a region in which recording medium exits a cassette inserted in the cassette receiving bay; and a lever means operable to move the roller drive means from a position in which a cassette can be inserted to a position in which it will contact recording medium as the recording medium exits an inserted cassette.

According to a seventeenth aspect of the present invention, there is provided an ink ribbon cassette comprising: a supply spool for holding a roll of ink ribbon; a take-up spool onto which ink ribbon unwound from the supply spool is wound; a driveable sprocket arranged to rotate the supply spool for rewinding unwound ribbon onto the supply spool; and a spring disposed to act axially on the sprocket for maintaining tension of the ink ribbon between the supply and take-up spools.

According to an eighteenth aspect of the present invention, there is provided a an ink ribbon cassette comprising: a hollow supply spool for holding a roll of ink ribbon; and a driveable sprocket at least part of which is disposed inside the supply spool to rotate the supply spool for rewinding unwound ribbon onto the supply spool, wherein the end of the sprocket that is not disposed inside the supply spool comprises an inner cylinder and an outer cylinder, the inner cylinder extending further in a direction away from the supply spool than the outer cylinder.

Other objects, features, and advantages of the present invention will become apparent from the following detailed description, the accompanying drawings, and the appended claims.

BRIEF DESCRIPTION OF THE DRAWINGS

Embodiments of the invention will now be described, by way of example only, with reference to the accompanying drawings in which:

FIGS. 11*a* to 11*i* show views of the tape cassette being inserted into a cassette receiving part of the printer;

FIG. 13 shows the fitting of leaf springs to the tape cassette;

FIGS. 25*a* and *b* show views of a bottom portion of the ink ribbon cassette of FIG. 24.

In the figures, like reference numerals indicate like parts.

DETAILED DESCRIPTION OF THE ILLUSTRATED EMBODIMENTS

Figure 1:
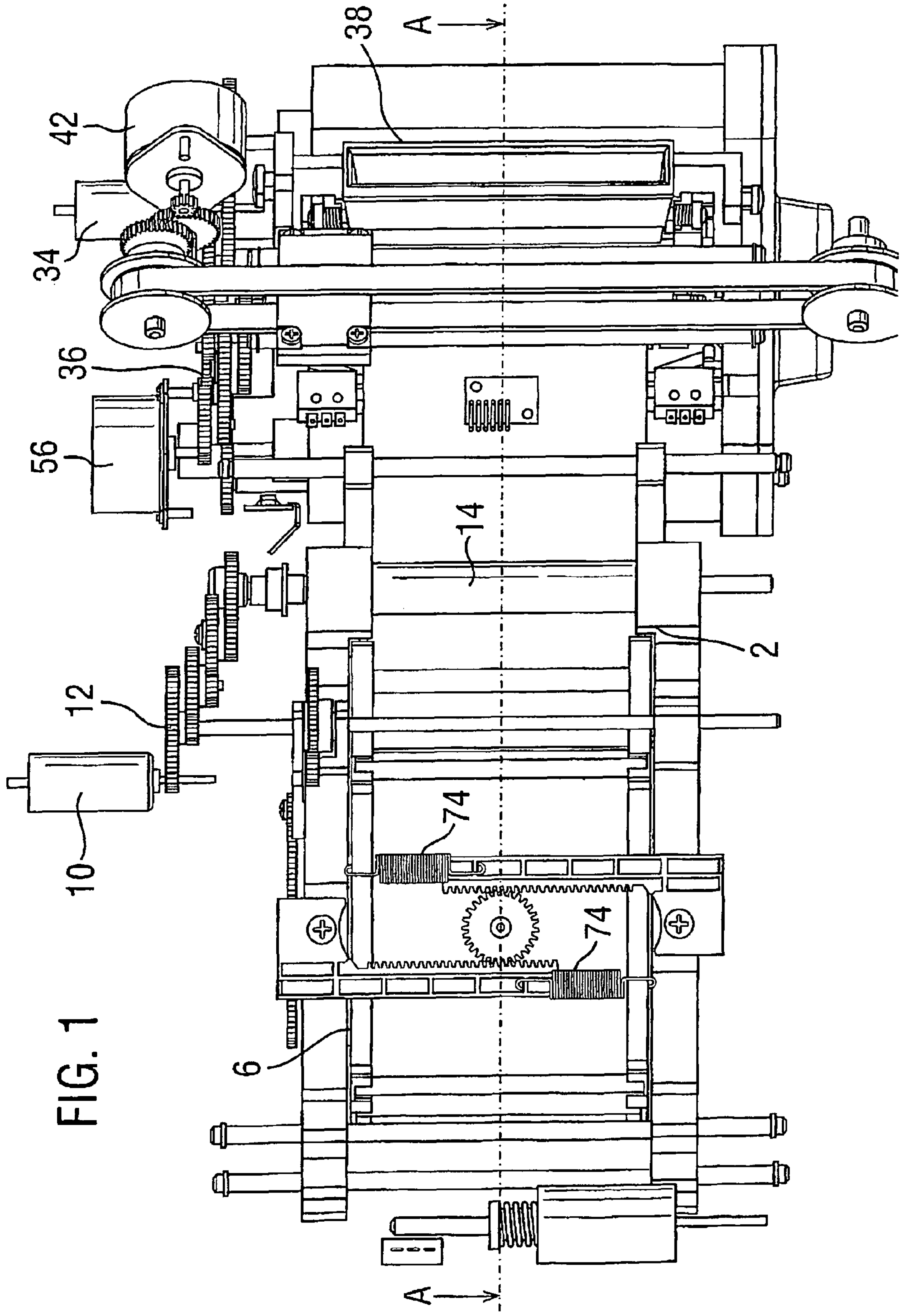
FIG. 1 is a plan view of the mechanical arrangement of a printing apparatus.
Figure 2:
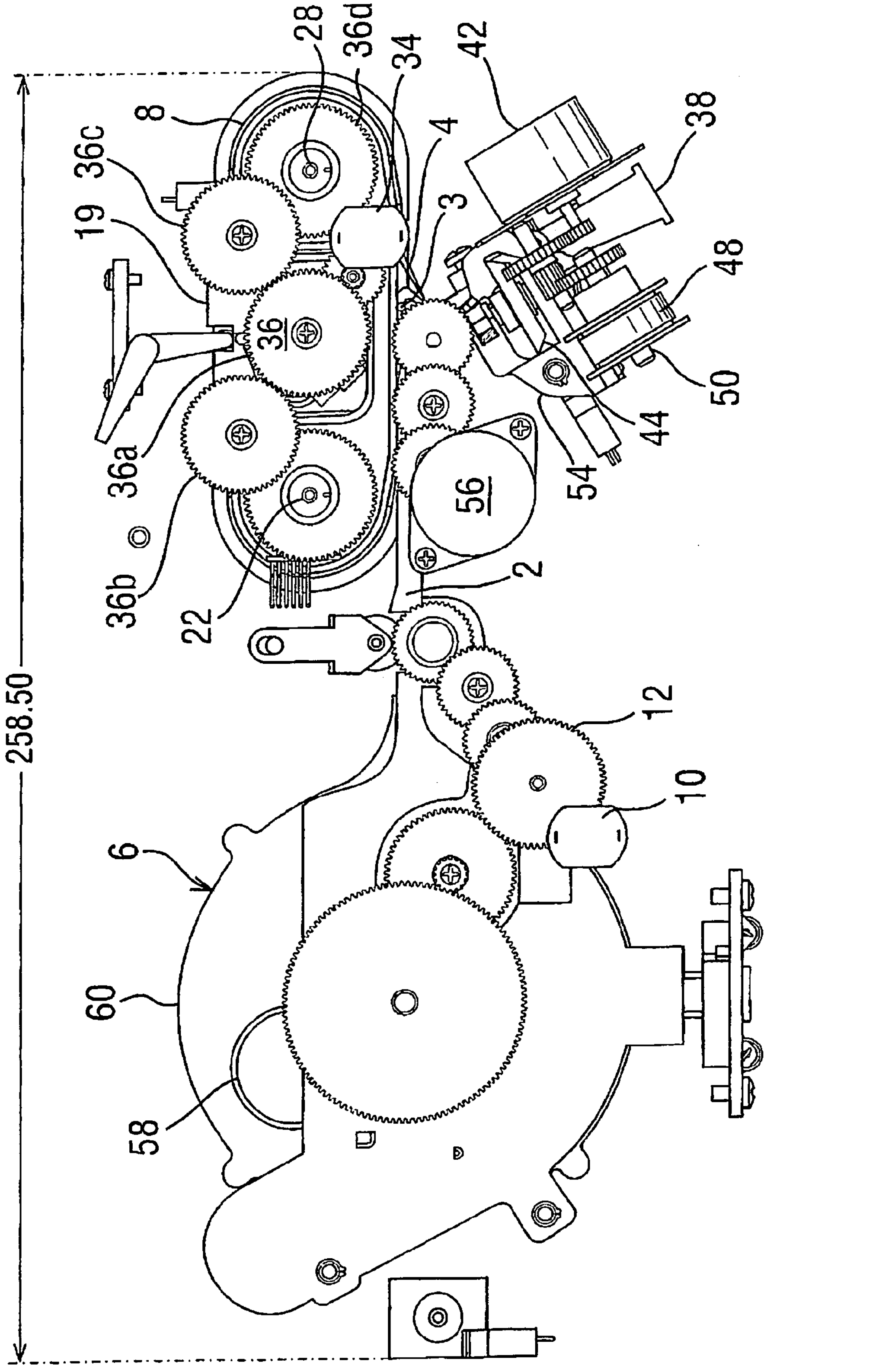
FIG. 2 is a side view of the mechanical arrangement of the printing apparatus.
Figure 3:
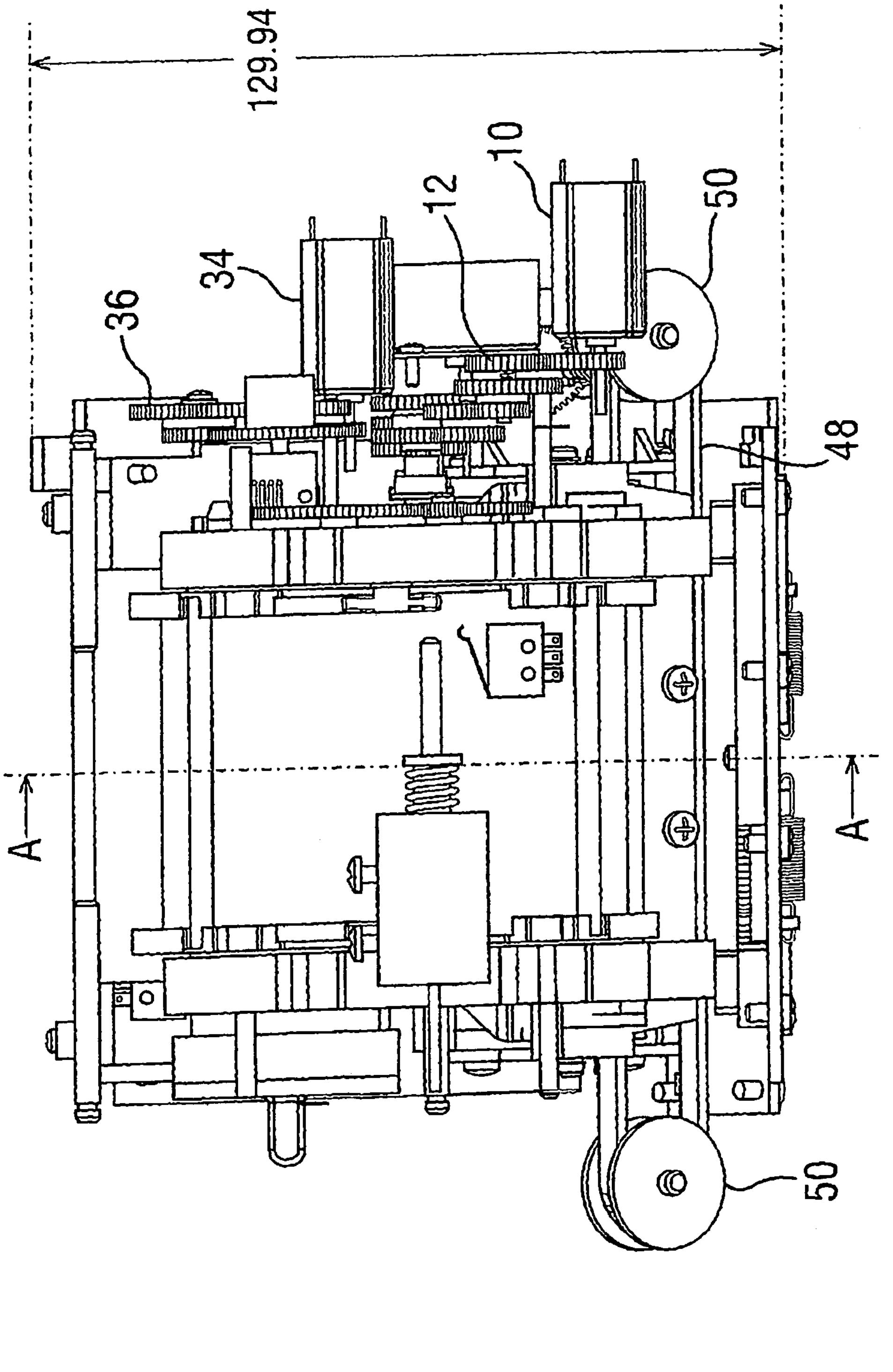
FIG. 3 is a front view of the mechanical arrangement of the printing apparatus.
Figure 4:
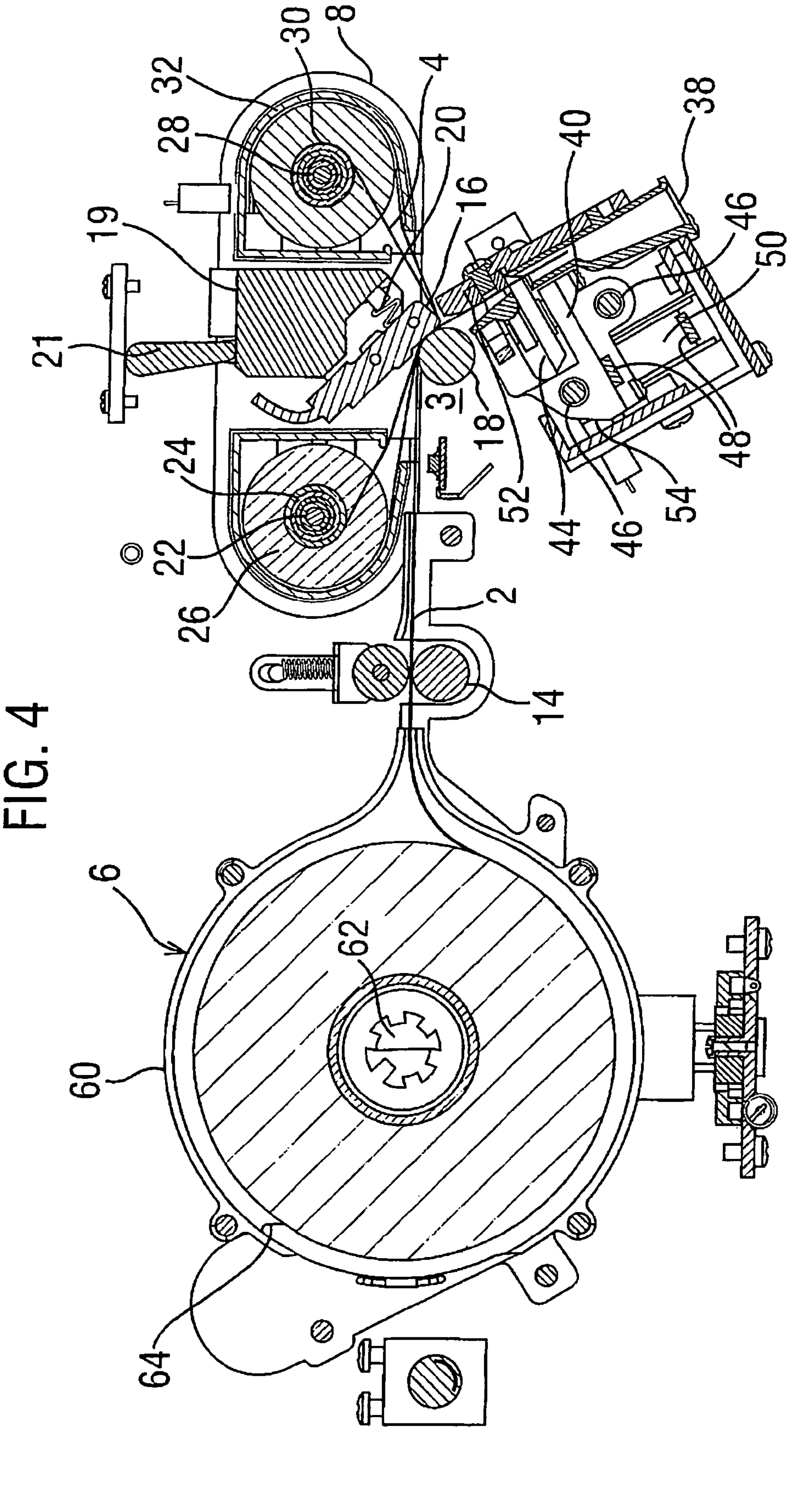
FIG. 4 is a cross-sectional view of the mechanical arrangement of the printing apparatus taken along line AA of FIG. 1.

The mechanical arrangement of the printing apparatus will now be described with reference to FIGS. 1 to 4. A label substrate comprises a tape 2 onto which images can be printed by a printing apparatus into which the label substrate is inserted. The tape 2 is housed in a tape cassette 6, the details of which can most clearly be seen from FIGS. 4, 6*a* and 6*b*, together with the exploded view of FIG. 10. The tape cassette 6 comprises front and rear portions 60 (alternatively termed upper and lower portions) which are generally circular in shape and an inner spool 62 around which a supply of tape 2 is wound. The inner spool 62 may rotate within the tape cassette 6 when tape is unwound. Two leaf springs 64 are attached one to each portion 60 to prevent the tape from unwinding more than is required, as will be described in more detail below. Elongate ribs 58 are provided on one of the portions 60 of the tape cassette 6 which allow it to be housed in a first receiving part 66 of the printing apparatus, as will also be described in more detail below.

Figure 6B:
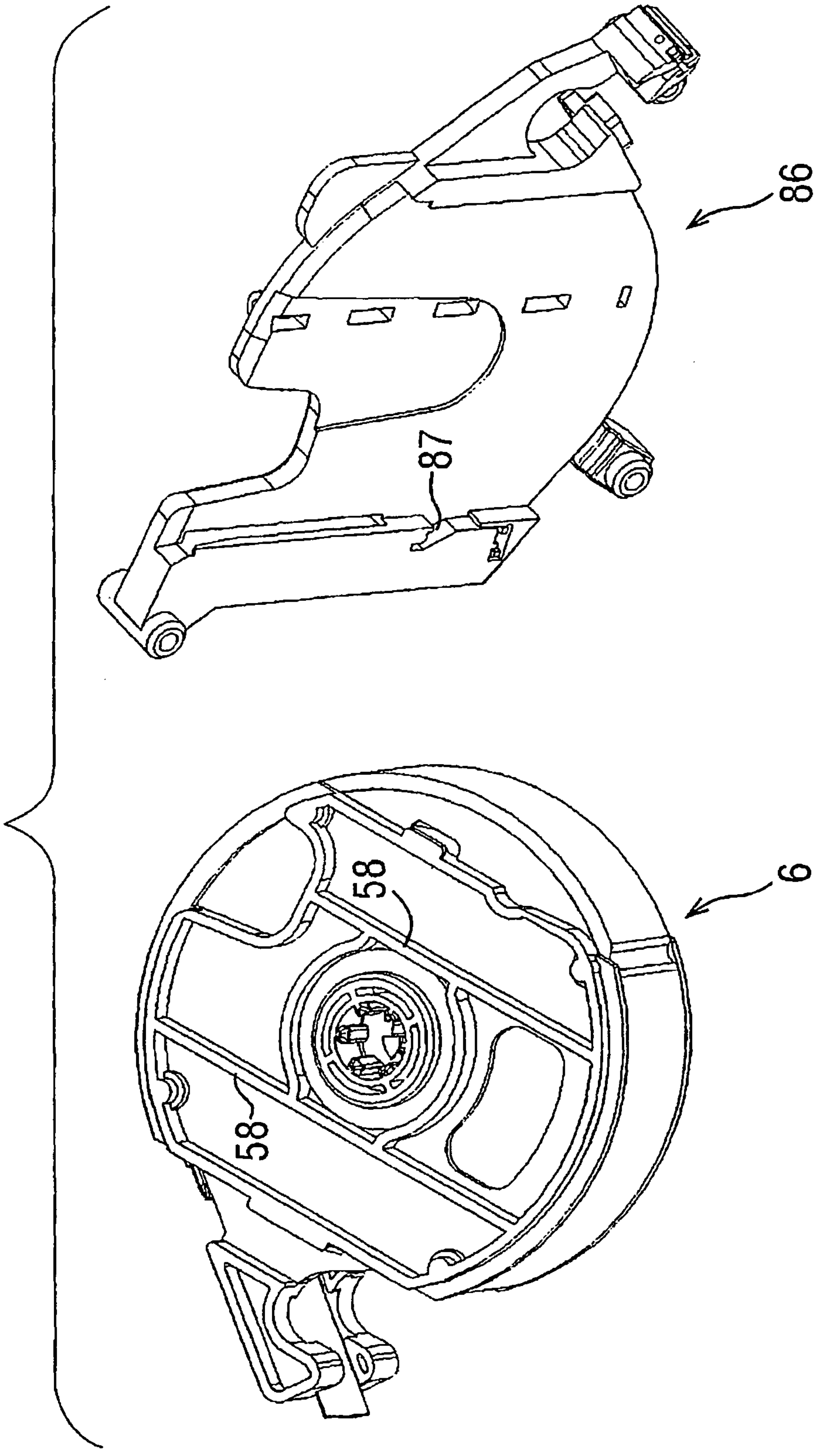
Figure 7A:
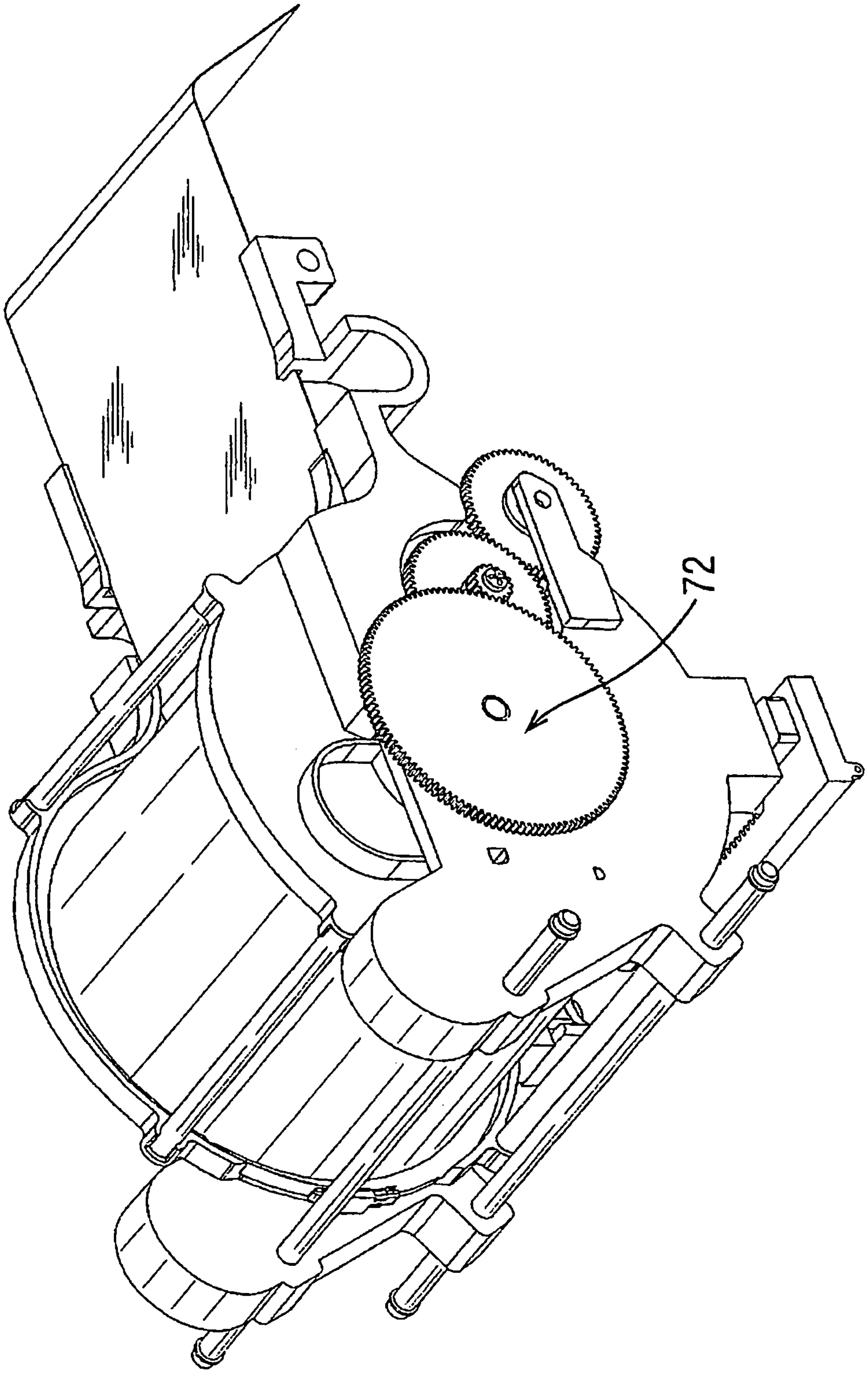
FIG. 7*a* is a perspective view of a tape cassette housed in a receiving part of the printing apparatus and FIG. 7*b* is a perspective view of the receiving part of the printing apparatus without the tape cassette installed.
Figure 7B:
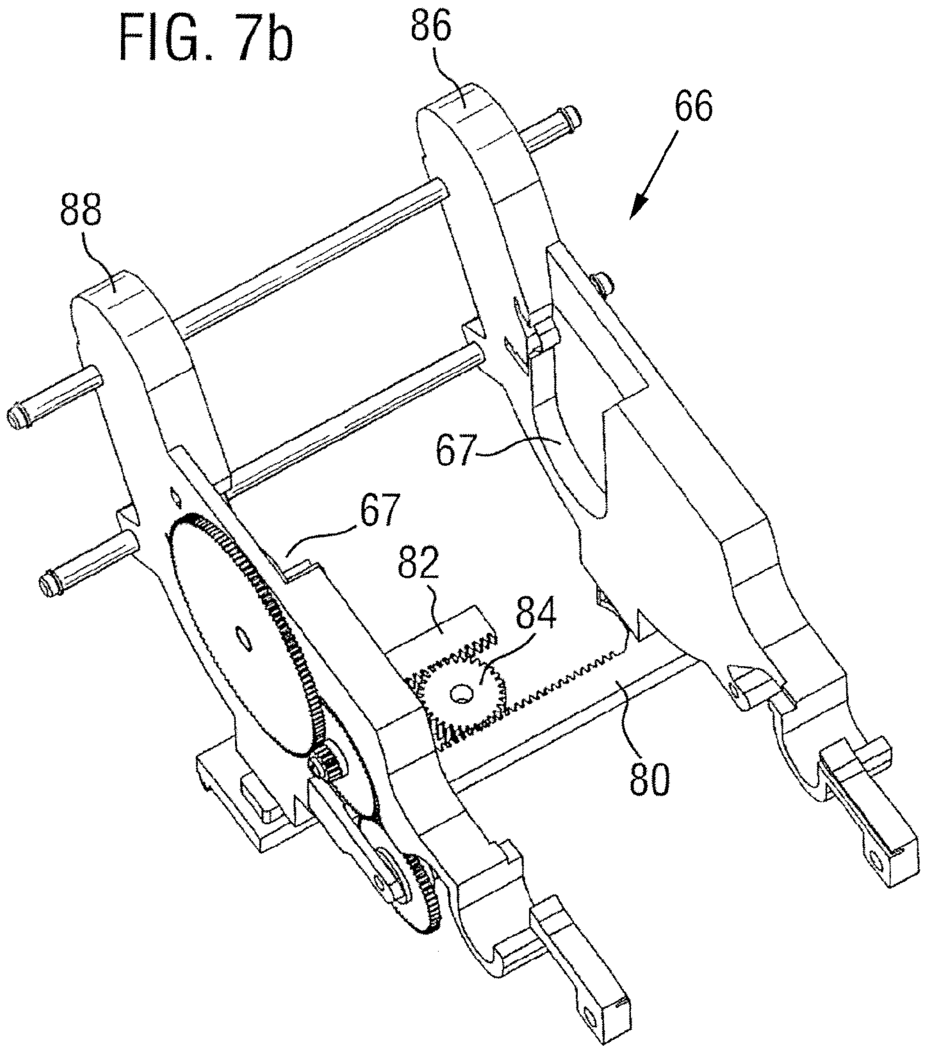
Figure 10:
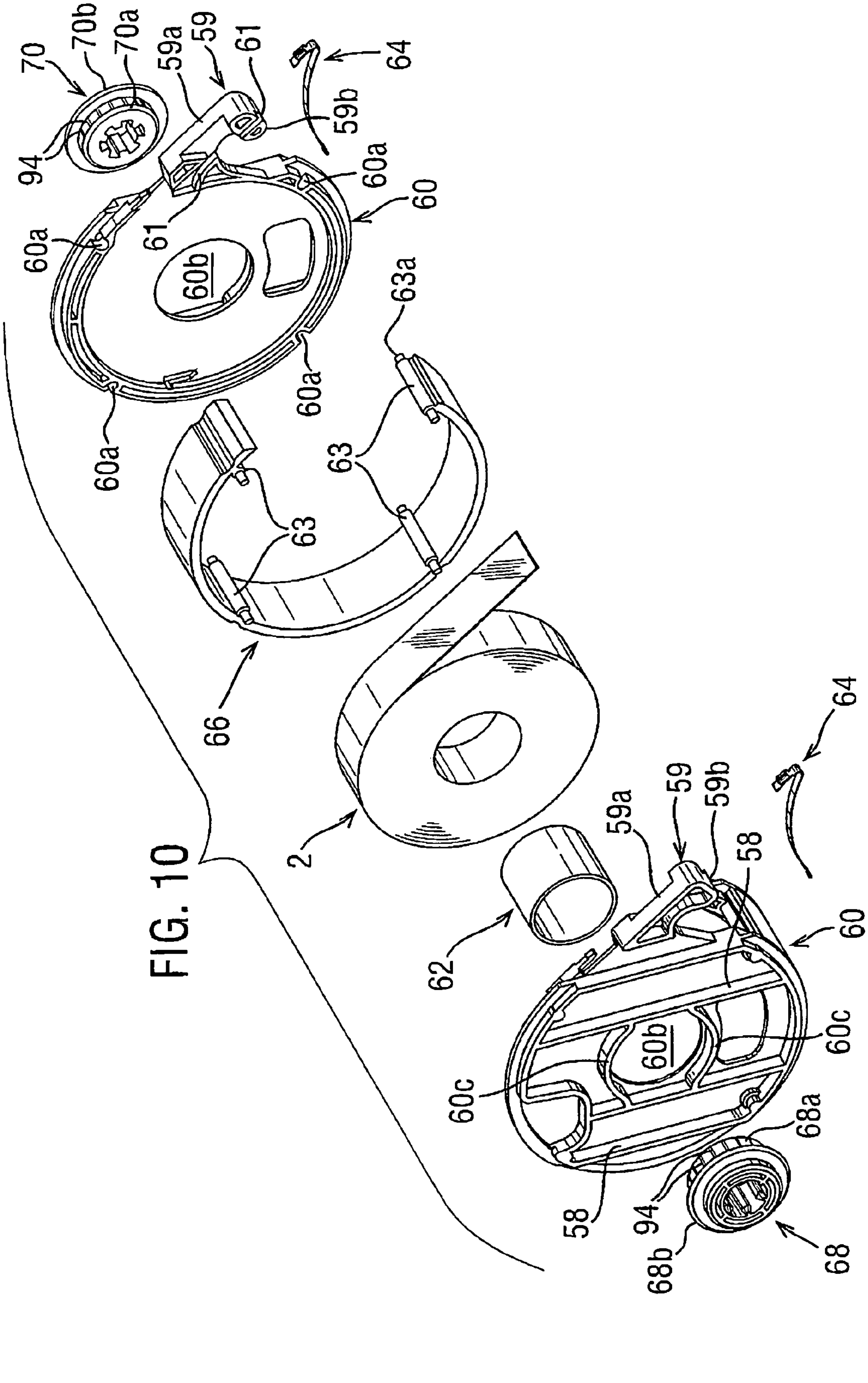
FIG. 10 shows an exploded view of the tape cassette of FIG. 6.
Figure 11B:
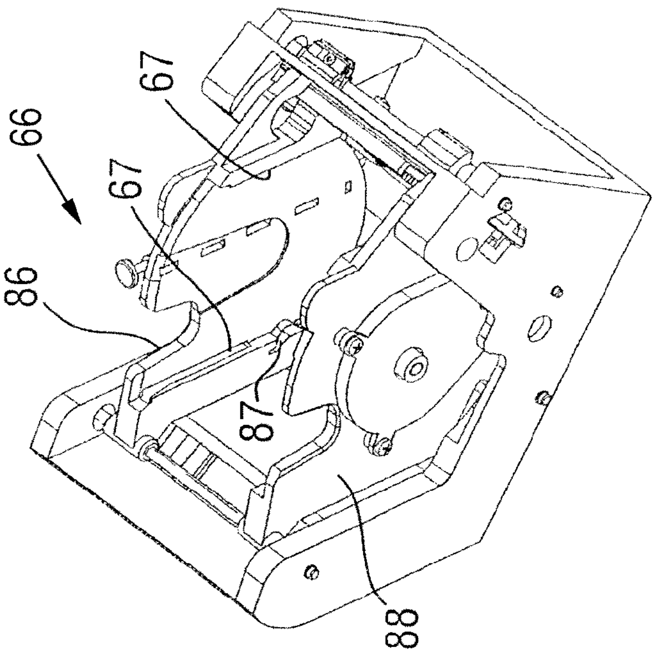
Figure 11A:
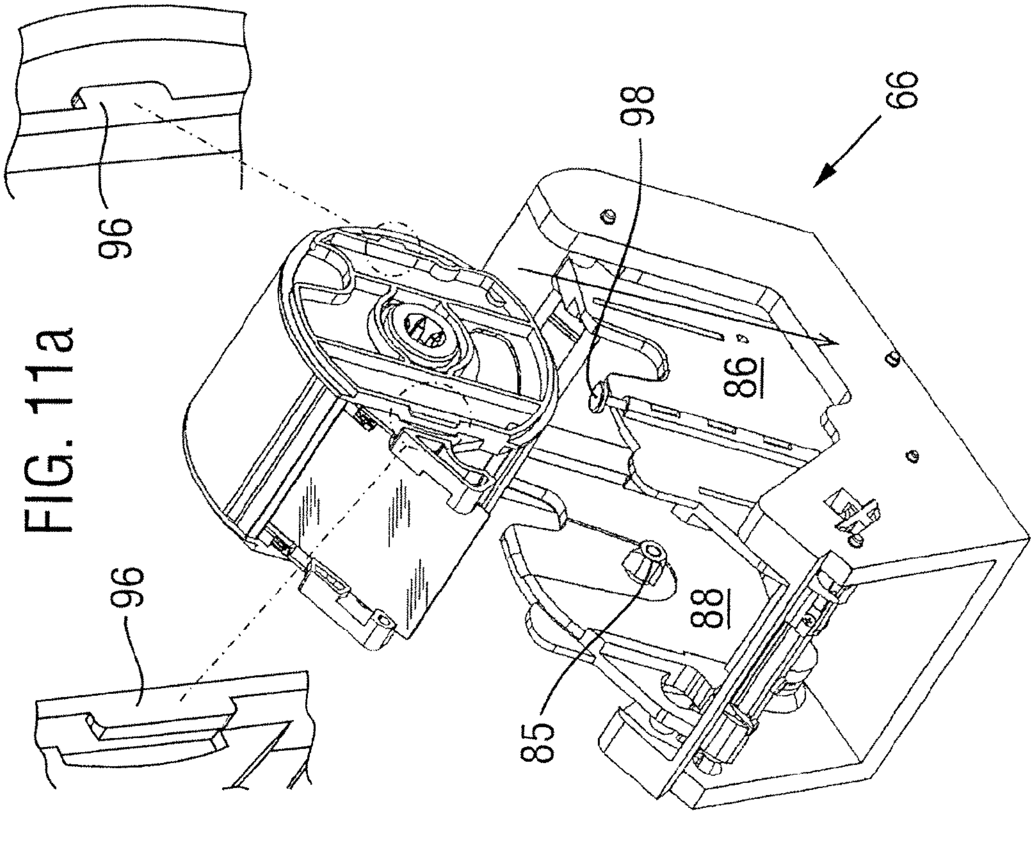
Figure 11H:
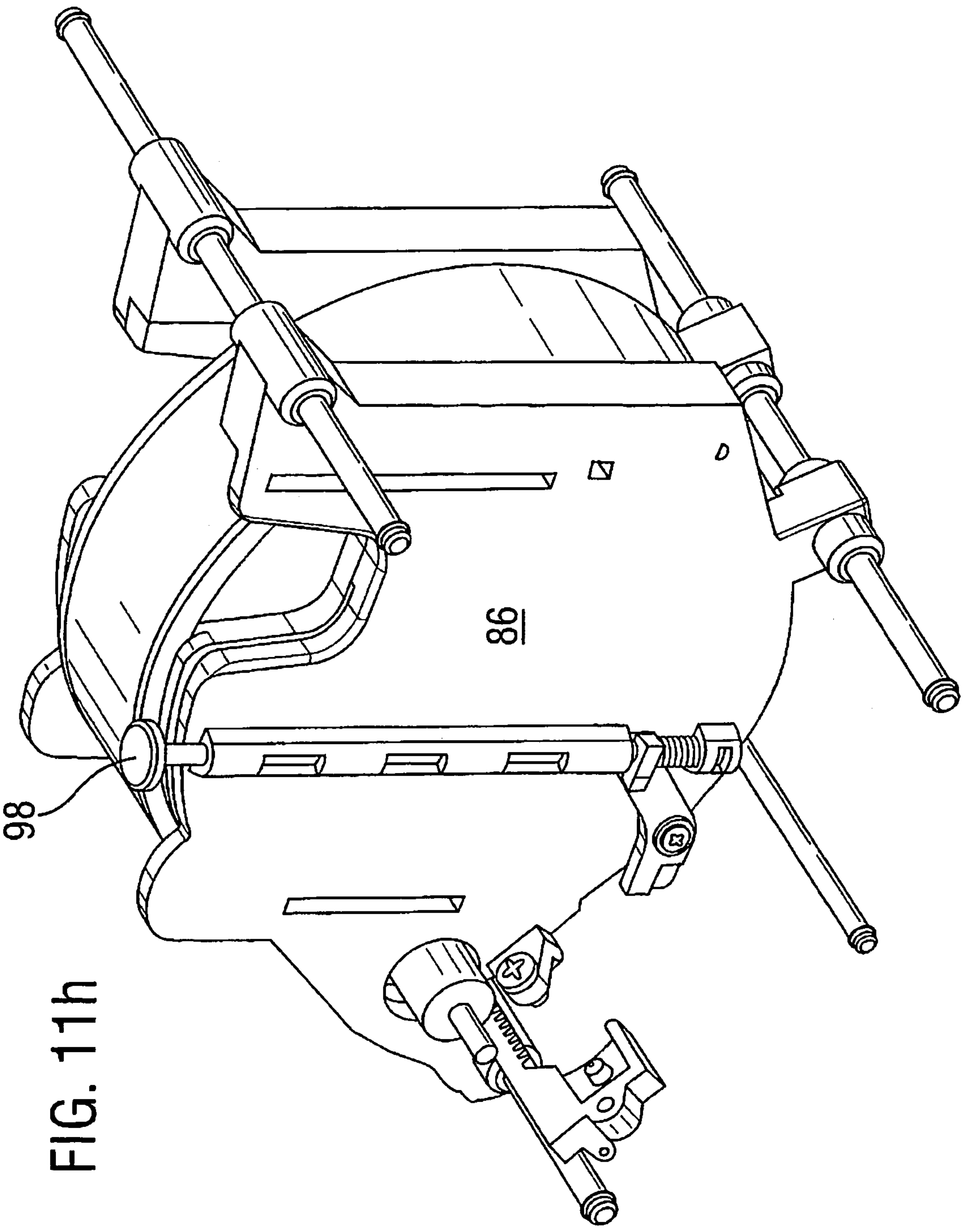
Figure 11I:
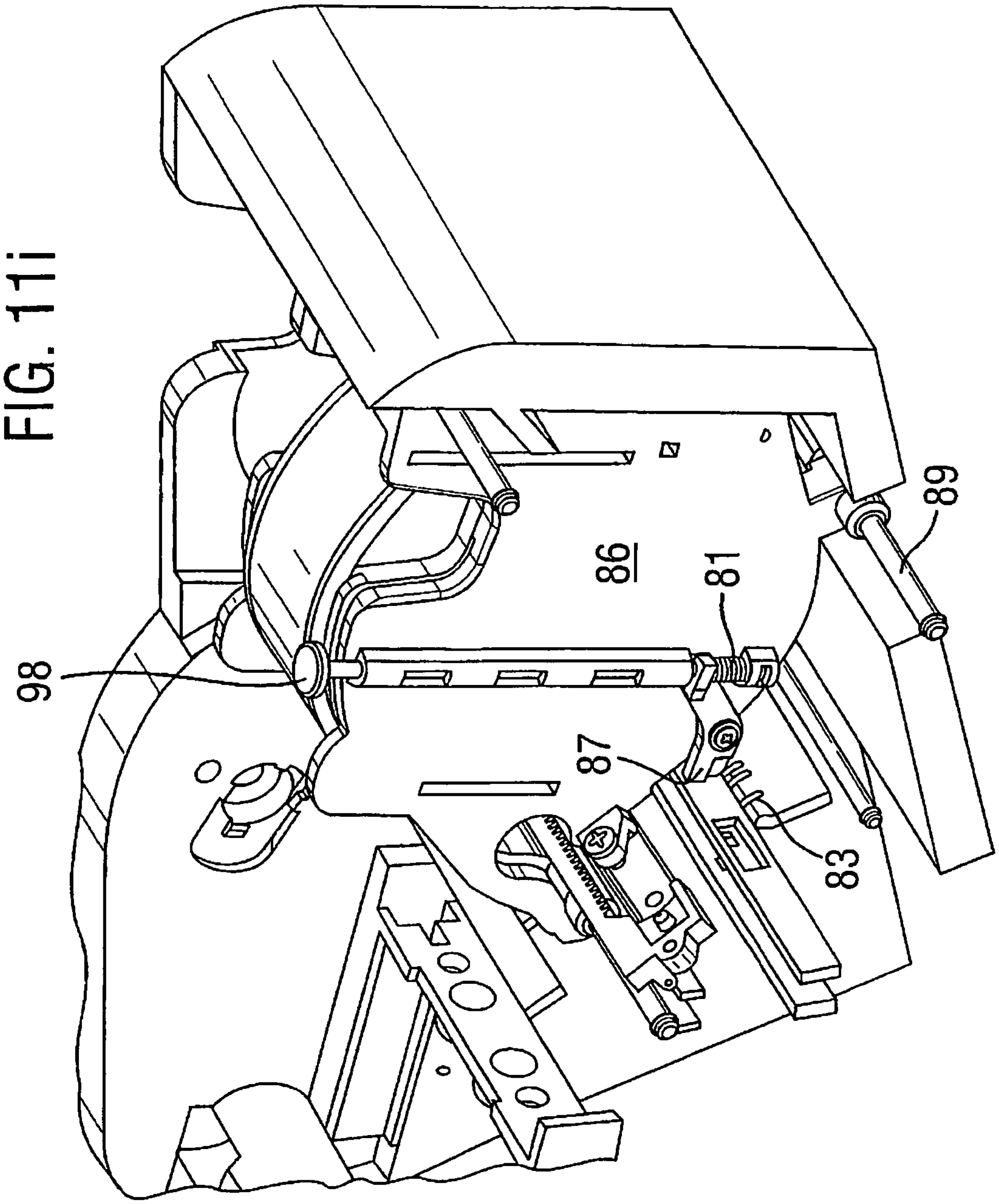
Figure 12C:
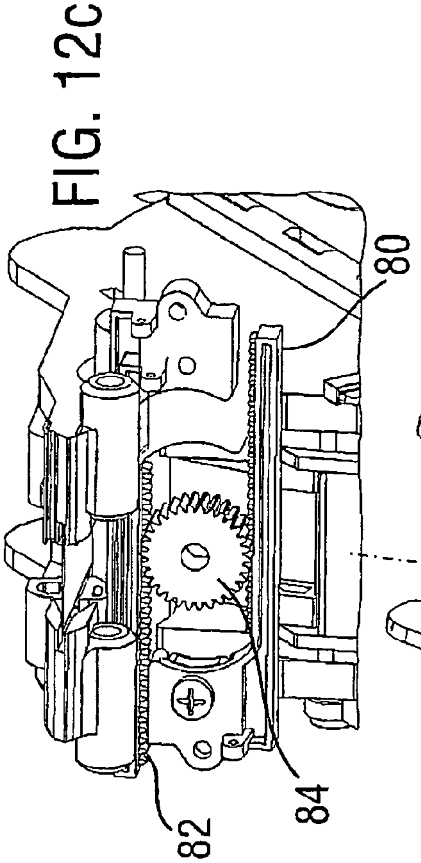
FIGS. 12*a*-12*d* show views of a mechanism for aligning and holding the tape cassette in the cassette receiving part.
Figure 12D:
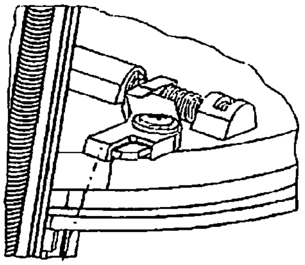
Figure 12B:
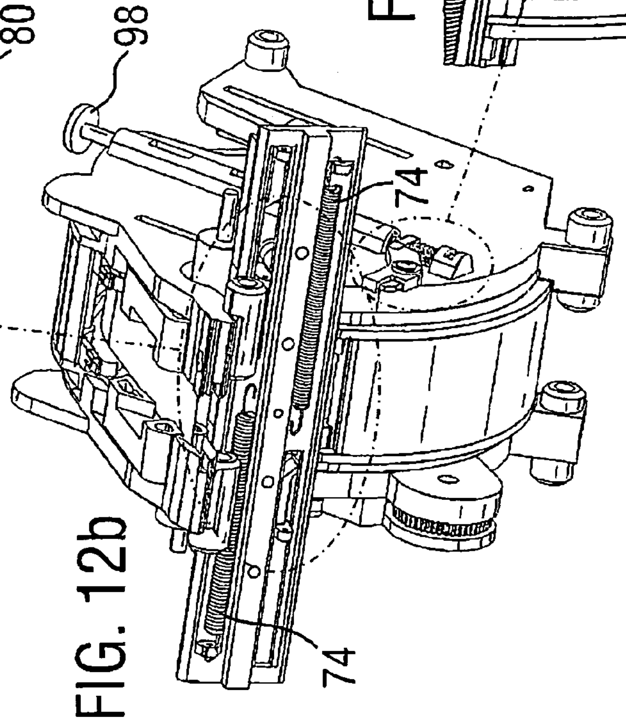
Figure 12A:
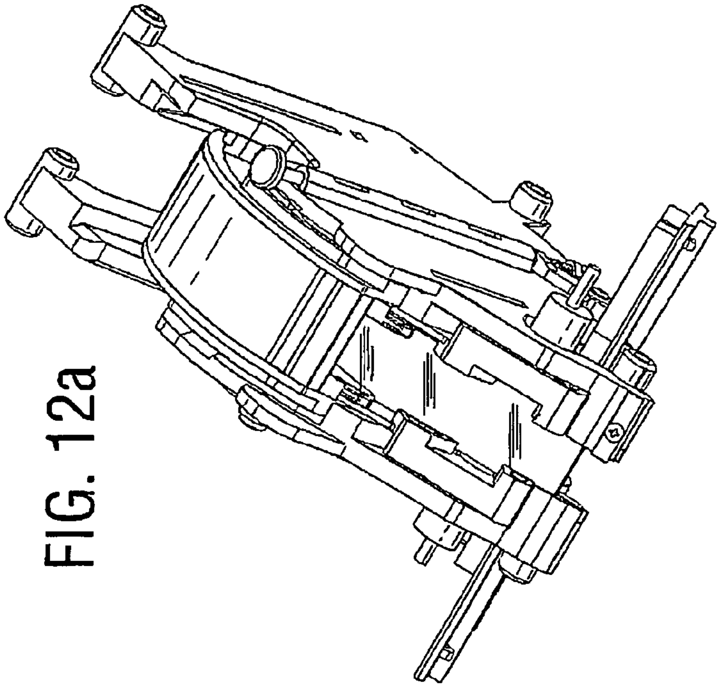

The first receiving part 66 is shown in FIG. 7*b* and also in FIGS. 11*a* and 11*b*. The first receiving part 66 has side supports 86, 88. The side support (or flange) 86 has two grooves 67 designed to accept the corresponding ribs 58 of the rear portion 60 of the tape cassette 6. These ribs 58 can be seen on the front portion 60 of the cassette 6 in FIG. 10. The ribs 58 are generally elongate and extend across the portion 60. Two ribs 58 are provided, running parallel and spaced apart across a width of the portion 60 taken perpendicular to the ribs 58. There is one rib 58 either side of a central cut-out 60*b* of the portion 60. Thus neither of the ribs 58 passes through the centre of the portion 60. Each rib has a projection 96 shown as a detail in FIG. 11*a*, the projections 96 projecting towards the outer edge of the portion 60 and themselves being generally elongate in a direction along the length of the ribs 58, although relatively much shorter than the ribs 58. The projections 96 are shaped to latch into detents 87 in the grooves 67 (only one of which is visible in FIGS. 6*b* and 11).

As discussed in the next paragraph, the user slideably inserts the cassette 6 so that the ribs 58 cooperate with one of the supports 86,88, while the opposing support moves in parallel. The opposing support has a sprocket 85 which is inserted into a sprocket 68 of the supply spool 62.

The supports 86, 88 are adjustable to accommodate different width cassettes as will now be explained, also with reference to FIG. 12. The supports 86 and 88 of the first receiving part 66 are connected to teethed arms 80 and 82. The teeth of teethed arms 80 and 82 engage with opposite edges of a cog 84. In this way any movement of one of the supports 86 or 88 is mirrored by the other support, so that each support is always an equal distance from a centre line A (shown in FIG. 1). This ensures that the tape will always be fed centrally to the print head, regardless of the width of the tape. The supports 86, 88 can be separated by a user to insert a cassette 6, this being facilitated by handles 99. Then springs 74 (shown in FIGS. 1 and 12*b*) bring the supports 86, 88 together to grip the sides of the tape cassette 6. In order to assist the user in inserting the tape cassette 6 there is provided a position actuation lever 98 disposed at the outer edge of the support 86. This lever is shown particularly in FIGS. 11*c*, 11*d*, and 11*g-i*. This lever 98 acts as a lock to hold the supports 86, 88 firmly at a number of positions. The lever 98 can be pressed at its top end against the action of a spring 81 at its lower end and then the support 86 slid apart from the support 88 such that a secondary lever 87 also disposed at the lower end of the lever 98 can be detented into one of a number of slots 83. The slots 83 are disposed in the frame of the printer. Sliding of the support 86 is assisted by a guiding shaft 89 onto which the bottom of the support 86 is fitted. When the lever 98 is released, the secondary lever 87 is released from a slot 83 in which it is inserted and the springs 74 can act to draw the supports 86, 88 together.

The above described ribs and grooves, and the support system can be used either together or separately to ensure good location and retention of the cassette 6 in the printer.

The printing apparatus comprises a gear chain 12, powered by a motor 10, which drives a feed roller 14 which causes the tape from the tape cassette 6 to move towards a print zone 3 of the printing apparatus. At the print zone, a print head 16 is biased against a platen roller 18 by a spring 20. The spring 20 is held within a print head mounting block 19.

As shown in FIG. 7*a*, the receiving part 66 is provided with a gear chain 72 powered by a motor 10 (shown in FIG. 1) that drives the feed roller 14 in order to rewind the tape onto the supply spool 62 to allow the cassette to be removed from the device. The printer is provided with a means of detecting when a cassette is to be removed. In this embodiment, a user can indicate at the keyboard 106 that a cassette is to be removed. This indication generates a signal which is received by the microprocessor 100 and then used to control the motor 10 to drive the spool 62 in a reverse direction. The microprocessor 100 controls the motor 10 to drive the feed roller 14 to rewind the tape 2 an amount corresponding to a predetermined distance range in the printer. The maximum distance is that from a cutting apparatus 40 (to be explained below) to where the tape 4 exits the cassette 6 when the cassette 6 is installed in the printer. The minimum distance is from the print zone 3 to where the tape 4 exits the cassette 6 when the cassette 6 is installed in the printer.

Rewinding of the tape 2 onto the supply spool 62 can only be done when the printhead is in an open condition, away from the platen roller. The printhead can be opened either manually or automatically.

An ink ribbon cassette 8 (shown in FIGS. 8*a* and 8*b*) holds an ink ribbon 4 and is mounted in a second receiving part of the printing apparatus. It is mounted on shafts 22 and 28 of the printing apparatus. The mounting block 19 may be moved by means of an actuator 21 to separate the printhead and the platen to allow the ink ribbon cassette 8 or the tape cassette 6 to be removed from the printer. Unused ink ribbon 26 is stored on a supply reel labelled generally as 24 and mounted on a printer shaft 22. Used ink ribbon 32 is stored on a take-up reel labelled generally as 30 and mounted on a printer shaft 28. A motor 34 powers a gear chain 36. When the motor 34 is driving forwards, a first set of gears 36*c*, 36*d* drive the shaft 28 to pull the ink ribbon 4 in a forward direction from the supply reel 24 to the take-up reel 30, and a slipping clutch (not shown) disengages the shaft 22 so that it is not driven, but is free to turn. When the motor 34 drives in reverse, a second set of gears 36*a*, 36*b* drive the shaft 22 to pull the ink ribbon 4 in a reverse direction from the take-up reel to the supply reel, and a slipping clutch (not shown) disengages the shaft 28 so that it is not driven, but is free to turn.

The ink ribbon cassette 8 is located in the printing apparatus so that the ink ribbon 4 has a path which extends through the print zone 3, and in particular extends in overlap with the tape 2 between the printhead 16 and the platen 18. The platen 18 is driven by a platen motor 56, to drive the tape through the print zone.

A cutting apparatus 40 is located downstream of the print zone 3. The cutting apparatus comprises a circular cutting blade or cutting wheel 44 mounted on a cutter holder 54. The cutting blade 44 cuts the tape 2 against an anvil 52. A cutter motor 42 drives the cutting wheel 44 from a rest position across the width of the tape. Once the cutting wheel 44 has traversed the entire width of the tape, the cutter motor 42 is reversed and drives the cutter holder 54 back to its rest position. The cutter holder 54 is slidably mounted on two sliders 46 which span the entire width of the tape 2. The cutter holder 54 is attached to a belt 48 which is supported by two rollers 50. One of the rollers 50 is driven by the cutter motor 42 to cause the cutter holder to move along the sliders 46.

The mechanical function of the printing apparatus will now be described. During printing, the tape feed motor 10 and the ink ribbon motor 34 are activated to drive the tape 2 and the ink ribbon 4 respectively past the printhead 16 at an equal speed. Once the tape reaches the print zone, it is picked up by the platen 18, driven by the platen motor 56. In this embodiment the microprocessor 100 runs a timer which commences driving of the platen motor 56 a predetermined time after the motor 10 has begun to feed the tape. In other embodiments an end-of-tape detector is provided to detect when the leading edge of the tape 4 has been driven to the print zone 3. In both cases, driving of the platen motor 56 commences shortly before the leading edge of the tape actually reaches the platen 18 but it could be arranged to commence exactly as the leading edge reaches the platen. When the platen 18 starts to rotate, driving of the motor 10 is stopped so as not to feed excess tape to the print zone 3.

An image is transferred onto the image receiving tape 2 by virtue of activation (heating) of particular printhead elements to transfer ink from the ink ribbon 4 to the substrate 2 in a known manner. Images are printed on a column by column basis as the tape 2 is moved past the printhead 16. This printing technique is known per se and so is not described further herein.

When the printing on a label is finished, the tape feed motor 10 and the ink ribbon motor 34 continue to feed the tape and the ink ribbon a predetermined distance until the end of the label is at the required cutting position. The tape may then be cut by the cutting apparatus 40. If die-cut labels are used, a label can be peeled off at this position. Once cutting is complete, the tape 2 is reversed by reversing the platen motor 56 that drives the platen 18 in reverse until the tape 2 is in the correct position for printing the next label. Whilst the tape 2 is reversed, the ink ribbon 4 is also reversed at approximately the same speed by driving the ink ribbon motor 34 in reverse. This prevents the ink ribbon 4 rubbing against the tape 2 and becoming damaged.

Figure 9:
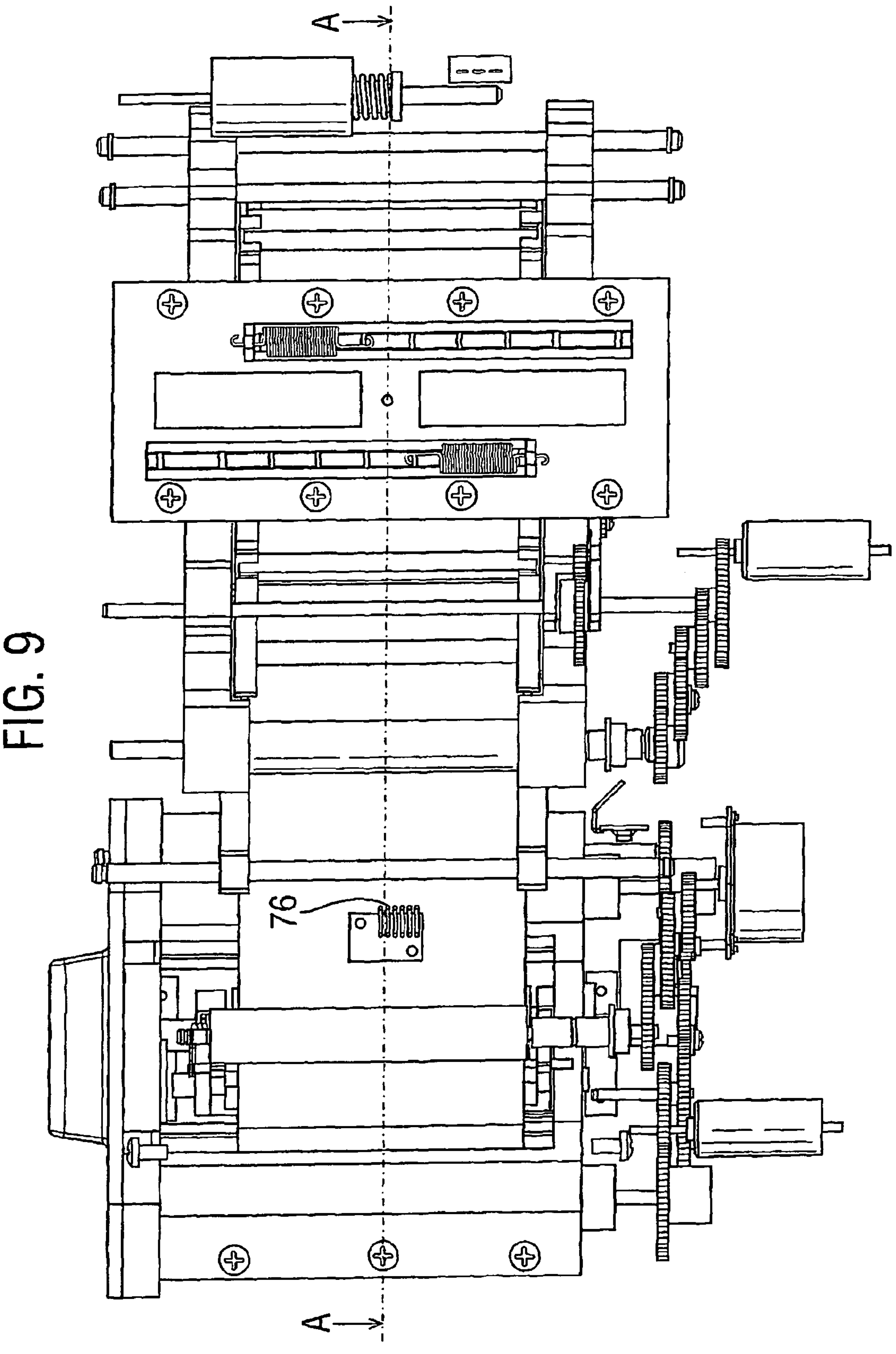
FIG. 9 is a plan view of the printing apparatus showing a photo-sensor.

A photo-sensor 76 shown in FIG. 9 is mounted on the frame of the printing apparatus and detects the presence of tape 2. This prevents the printer printing if there is no tape present in the printer.

Figure 5:
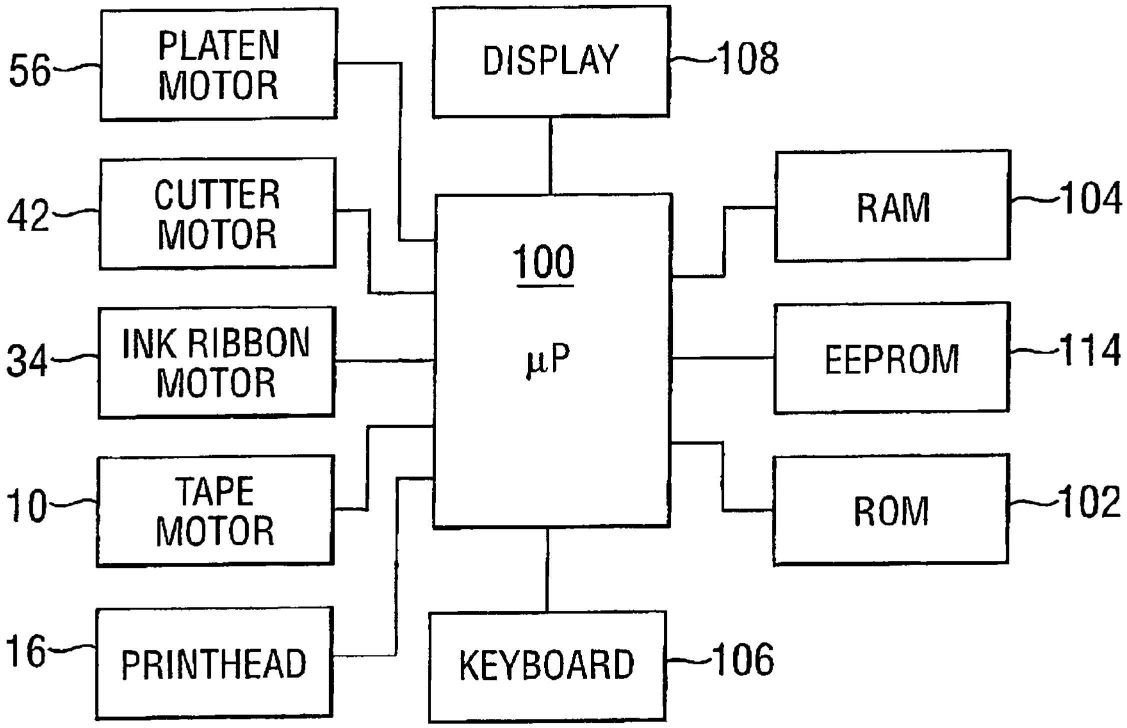
FIG. 5 is a schematic block diagram of control components of a printing apparatus.

FIG. 5 shows a schematic block diagram of the control components of the printing apparatus. A microprocessor 100 controls operation of the printing apparatus and is associated with a read only memory ROM 102, an electronically erasable programmable read only memory EEPROM 114 and a random access memory RAM 104. The printing apparatus includes a keyboard 106 for entering data (e.g. characters and symbols) and control commands for printing, and a display 108 for displaying to the user labels under edit, control commands, error messages, etc. The microprocessor 100 controls the printhead 16, tape drive motor 10, ink ribbon motor 34, cutter motor 42 and the platen motor 56.

Various details of the tape cassette 6, an alternative tape cassette 100 and the ink ribbon cassette 8 will now be described.

Reference is firstly made to FIG. 10, which shows an exploded view of the tape cassette 6. The tape cassette 6 is made from a number of component parts which can be put together manually or with a simple machine technique. No complex industrial processes such as welding are required. The tape cassette 6 is conveniently made from plastics material but other suitable materials could be used. The assembly process is as follows:

(i) The spool 62 is placed in the centre of a roll of tape 2. In this embodiment the tape 2 is formed of a backing layer together with an upper layer which is to be printed, the upper layer being pre-cut into a series of labels. A continuous upper layer which can be cut with the cutting apparatus 40 is used in other embodiments.

(ii) A profile 66 or side portion of the cassette 6 is press-fit into one of the portions 60. The profile 66 forms the side of the tape cassette 6, the portions 60 forming the front and rear or upper and lower parts of the case. The profile 66 is generally of open-ended cylindrical form but does not form a complete cylinder. When the tape cassette 6 is assembled, the absent part of the cylinder is located in the region where the tape exits the cassette 6. The profile 66 has four posts 63 formed on the inner surface of the profile 66 and running across the "length" of the part-cylinder of which the profile 66 is formed i.e. across the width of the profile 66. Each post 63 has a rounded protrusion 63*a* at each end which is for press-fitting into a corresponding groove 60*a* cut out of the outer edge of each portion 60. Thus the profile 66 is fitted into one of the portions 60, which in this embodiment we will call the rear portion. More or less than four protrusions and grooves could be used. The positions of the protrusions 63*a* and the corresponding positions of the grooves 60*a* ensure that the profile 66 is correctly fitted to the portion 60, such that the absent part of the cylinder from which the profile 66 is formed aligns with an exit area of the tape cassette 6. The exit area of the portions 60 is shown by the presence of a flange 59, which will be described in steps (iii) and (iv) below.

Figure 6A:
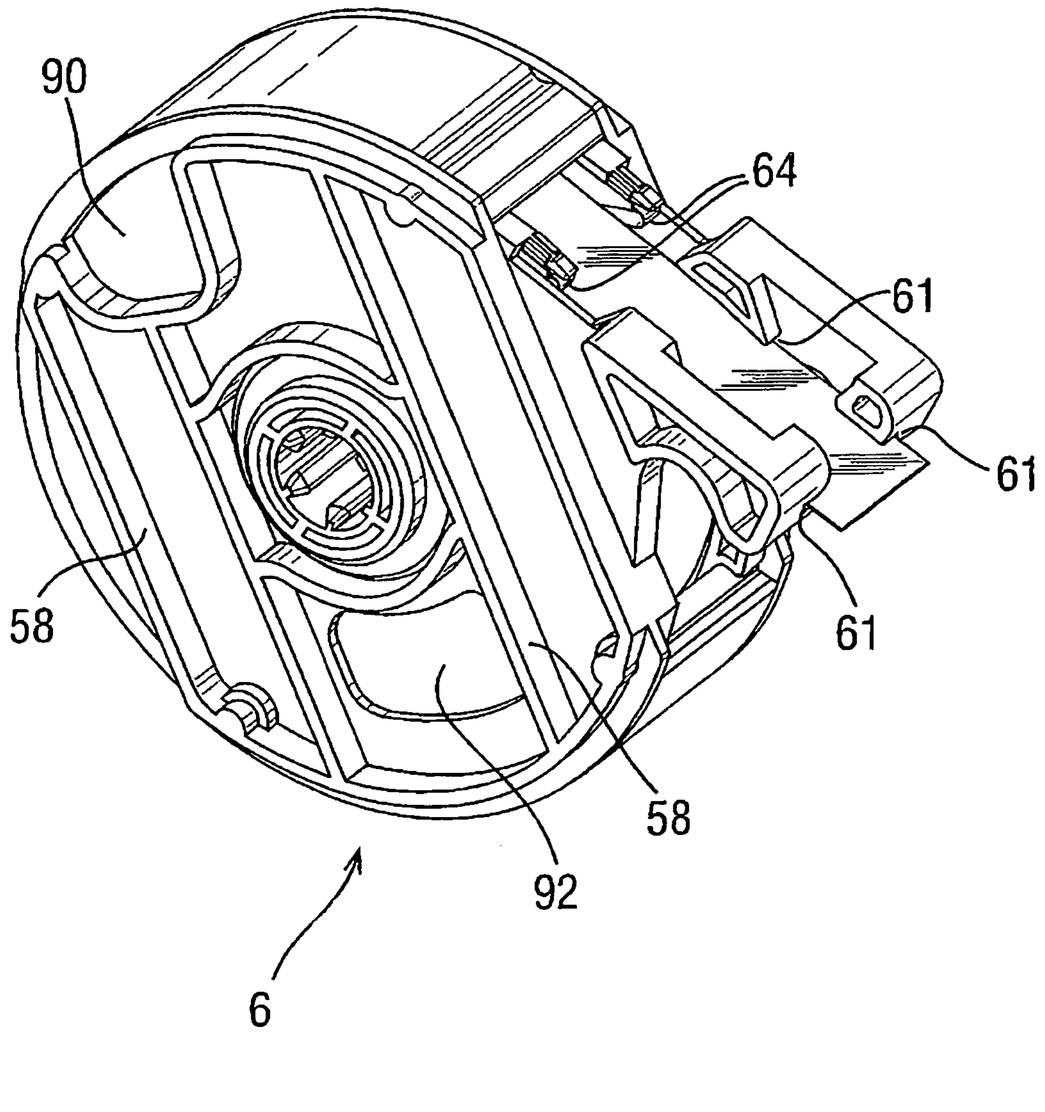
FIGS. 6*a* and 6*b* are perspective views from different angles of a tape cassette, FIG. 6*b* also showing a part of the printing apparatus which interacts with the tape cassette.

(iii) The tape 2 on the spool 62 is placed into the joined profile 66 and rear portion 60. The end of the tape 2 is placed in the flange 59. FIG. 10 and FIG. 6*a* show that each flange 59 protrudes tangentially outwards from the generally cylindrical form of the tape cassette 6 and comprises two grooves 61 formed by upper 59*a* and lower 59*b* portions of the flange 59 and spaced apart along the length of the flange 59, one groove at the end nearest the body of the portion 60 and the other at the end distal from the body of the portion 60. Thus at this stage of the assembly procedure, one edge (the rear edge in FIG. 10) of the tape 2 is simply pushed into the grooves 61.

(iv) The other portion, front portion 60 is press-fit to the free edge of the profile 66. The grooves 60*a* of the front portion are not visible in FIG. 10 but are aligned with the grooves 60*a* in the rear portion 60 and the protrusions 63 in the profile 66. Thus the tape 2 and the spool 62 are encased within the two portions 60 and the profile 66. The edge of the end of the tape 2 that is not already in the flange 59 of the rear portion 60 is pushed into the grooves 61 of the front portion 60.

(v) The front and rear portions 60, although generally circular in shape, contain a central hole or cut-out portion 60*b*. A sprocket 68 is pushed into the hole 60*b* in the front portion 60 to form a press-fit in the spool 62, and a plug 70 is pushed into the hole 60*b* in the rear portion 60 to form a press-fit in the other end of the spool 62. The sprocket 68 has an inner cylindrical portion 68*a* with formations that can be picked up to drive the sprocket 68 and hence the spool 62 to rewind tape 2 onto the spool 62 during reverse feeding. The plug 70 also has an inner cylindrical portion 70*a*. The inner cylindrical portions of the sprocket 68 and the plug 70 are sized to be able to rotate in the holes 60*b* in the portions 60. The sprocket 68 and the plug 70 both have circular flanges 68*b*, 70*b* extending from the inner cylindrical portions 68*a*, 70*a* which fit inside curved ribs 60*c* on the portions 60. Only the ribs 60*c* on the front portion 60 are visible in FIG. 10.

(vi) The leaf springs 64 are assembled onto the front and rear portions 60. This part of the procedure is shown more clearly in FIG. 13. Each leaf spring 64 has a substantially straight attachment portion 64*a* and a longer, curved drag portion 64*b*. The inner faces of the portions 60 each comprise a protrusion 60*d* aligned with the protrusion 59 but protruding from the region of the portion 60 at a position which substantially coincides with one end of the profile 66. Thus the protrusions 60*d* are located at the exit point of the tape 2 from the cassette 6. The protrusions 60*d* are widest where they emerge from the portions 60 and step down to a narrower portion at their distal ends. The attachment portion 64*a* of each leaf spring comprises a resilient curved portion 64*c* on its upper side, which is designed to be pushed over the narrower portion of a protrusion 60*d* and then abut on the end of the wider portion of the protrusion 60*d*. Arrows show the direction of fitting of the leaf springs 64 and FIG. 13*b* shows the protrusions 64*d* in detail. Once fitted, the longer portion 64*b* of the leaf springs 64 curves downwards so that it just touches the wound tape 2. The drag caused by the leaf springs 64 prevents excessive unwinding of the tape 2 when the cassette 6 is not being used for printing, but the drag force is overcome to unwind the tape during printing. The drag force nevertheless prevents excessive unwinding of the tape 4 during printing as well as when the cassette is not being used for printing. Due to the shape and attachment of the leaf springs 64, the drag force has a main component acting in a direction towards the centre of the spool (although some force may be exerted along the tape). Since there are two leaf springs, the drag force acts towards the outer edge of both sides of the tape.

Two further features of the tape cassette 6 can be seen in FIG. 6. Firstly, the portions 60 each have an area cut-out of the edge which forms a finger grip 90. This is conveniently disposed some way round from the exit area of the cassette 60 so that the finger grip can be held in one hand and the tape 2 in the other. Another shaped cut-out disposed in between the edge and the centre cut-out 60*b* forms a viewing hole 92 which allows a user to view the type of labels or tape contained in the tape cassette 6.

It should be noted that once the cassette 6 is assembled, the two flanges 59 form a sleeve for the tape 2 which holds the tape 2 on either edge. It can further be seen that the flanges 59 are disposed symmetrically across the width of the tape cassette 6 (i.e. along the "length" of the cylindrical form of the profile 66) and that therefore as a result of running through the grooves 61 the tape 2 is centred as it exits the tape cassette 60. This is an important feature because if the tape 2 were to exit the cassette off-centre, this deviation might not be correctable in the printer and hence the tape 2 would arrive at the printhead 16 off-centre, resulting in poor printing quality.

It has been mentioned above with respect to the mechanism shown in FIG. 12 that the printer is designed to accommodate cassettes of different widths, carrying tapes of different widths. Cassettes 6 of different widths are achieved by varying the length dimension of the profile 66 in accordance with the tape 2 so that the cassette 6 is of a suitable width to accommodate a tape 2 without excessive space between the tape 2 and the portions 60. In other words, the tape width is generally just slightly less than that of the profile 66. The differently-dimensioned profiles are achieved by use of the same manufacturing tooling. The tooling is a plastic injection mould and includes an ejector plate in a mould for moulding the profile 66, and the differently-sized profiles are achieved by putting the ejector plate in different positions. Differently-sized profiles 66 can be used with the same portions 60 since they have the same press-fit attachments.

Figure 14A:
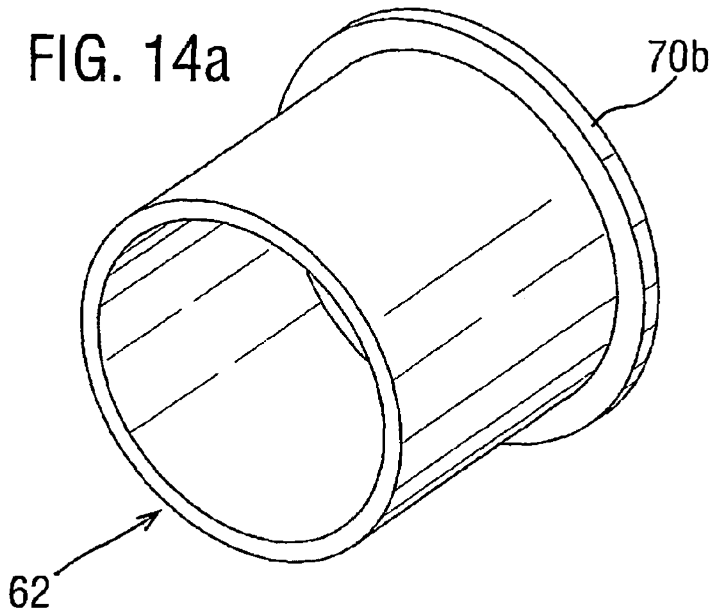
FIG. 14 shows a detail of a spool and sprocket of the tape cassette.
Figure 14B:
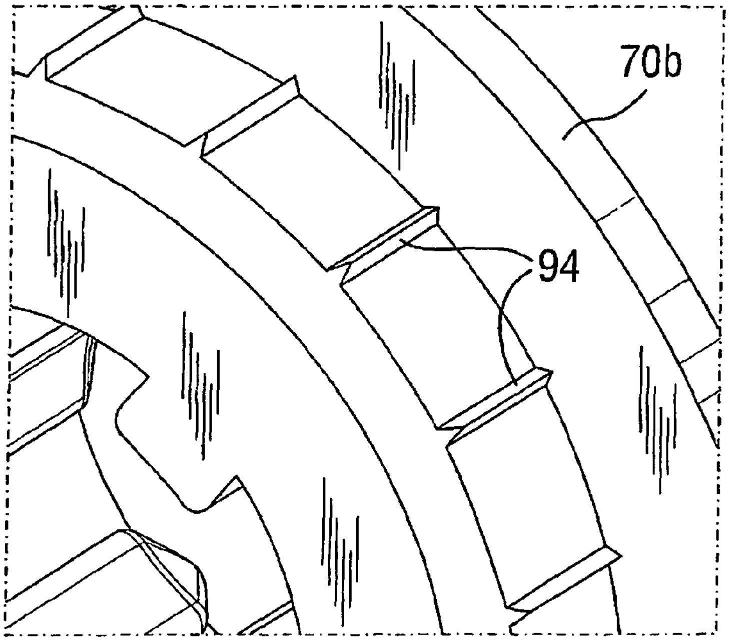

Referring now to FIG. 14 as well as FIG. 10, another feature of the sprocket 68 will be described. It can be seen in FIG. 10 that the inner cylinder 68*a* of the sprocket 68 and the inner cylinder 70*a* of the plug 70 have a featured exterior surface. The features are ribs 94. These can be more clearly seen in FIG. 14*b*, which shows a close-up of the surface of the plug 70. FIG. 14*a* shows the spool 62 with the plug 70 fitted such that the circular flange 70*b* abuts on the edge of the spool 62. The ribs 94 are angled and are therefore triangular in cross-section, extending out of the inner cylinder 70*a*. The spool 62 is made of cardboard, hence in fitting the plug 70 through the cut-out portion 60*b* of the rear portion 60, the inner cylinder 70*a* slides into the spool 62 and the ribs 94 are pressed into the inside of the spool 62. The ribs 94 on the sprocket 68 are fitted in a similar manner at the other end of the spool 62.

The ribs 94 bear on the inside surface of the spool 62, thus providing the advantage of preventing loosening of the spool 62 on the sprocket 68 and the plug 70. This prevents unwanted movement of the tape 2 away from its roll. Another advantage is that the tolerance on the spool diameter is less critical which reduces manufacturing and quality control costs. The particular configuration of the protrusions is not critical, as long as there is an interference fit between the protrusions and the inside surface of the spool 62. However, the serrated nature of the ribs 94 assists in preventing loosening of the spool 62 on the sprocket 68.

A second embodiment of a cassette and printer will now be described. The features of the tape cassette which differ from those of the cassette 6 will be highlighted and the different insertion method of the cassette will also be explained. Thus the second printer is similar to the previously-described printer but differs in the cassette receiving bay.

Figure 15:
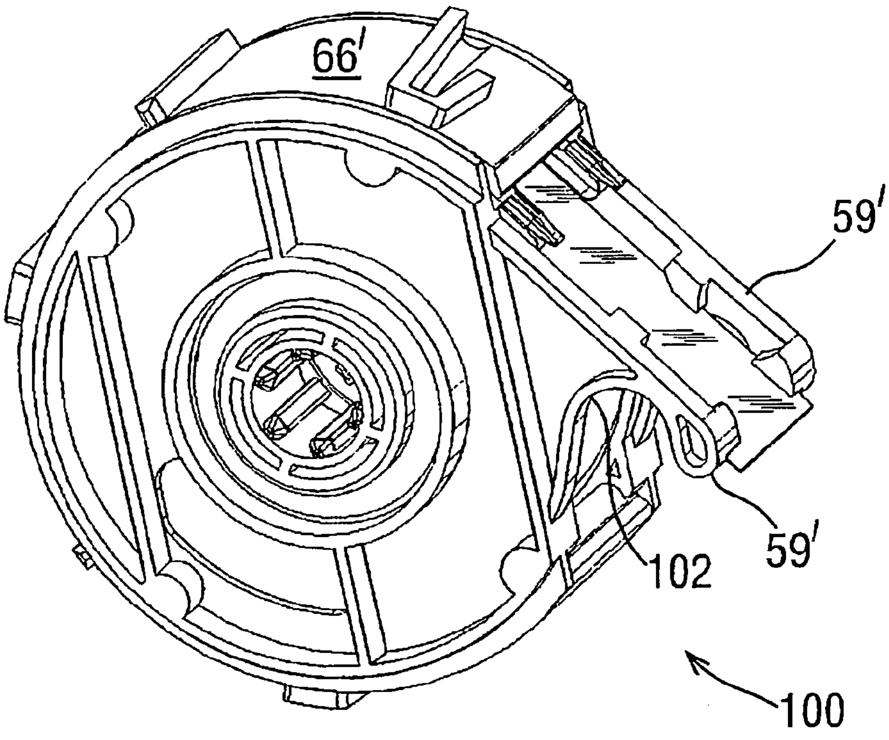
FIG. 15 shows a tape cassette of a second embodiment.

A cassette of the second embodiment is shown in FIG. 15, indicated generally by reference numeral 100. The cassette

100 is constructed in a similar manner as the cassette 6 from similar pieces, so the construction process is not being repeated here.

One difference between the cassette 100 and the cassette 6 is the shape of the tape exit region of the cassette. In the cassette 100 the flanges 59' are differently shaped from the flanges 59 of the cassette 6 such that the underside of the flanges 59' forms a more pronounced recess 102 with the main body of the cassette 100. This recess is for receiving an idler roller 104 of the printer which the emerging tape moves against, as shown in FIG. 18.

Figure 16:
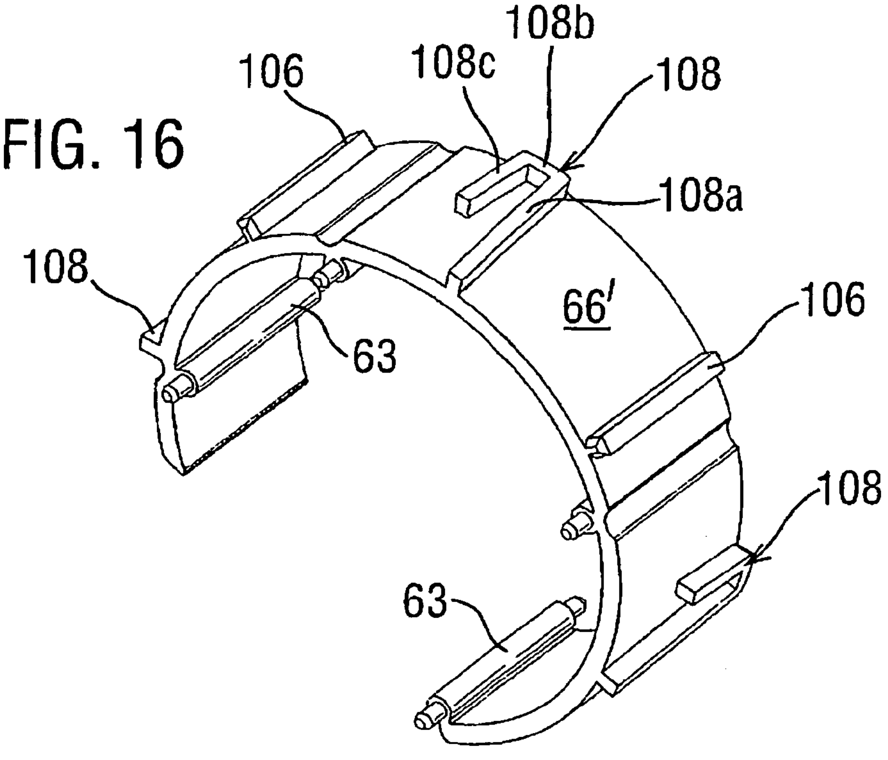
FIG. 16 shows a detail of a profile of the tape cassette of FIG. 15.

Another difference between the cassette 100 and the cassette 6 is in the design of the profile 66'. The profile 66' is better shown in FIG. 16. On the outer edge of the profile 66' are two positioning ribs 106 and three fixation ribs 108. The positioning ribs run across the width of the profile 66' (i.e. along the "length" if the profile is considered to be a cylinder) and are elongate in shape and substantially straight. Their purpose is to prevent the cassette 100 turning in a radial direction when inserted in the printer. The purpose of the fixation ribs 108 is to prevent axial movement of the cassette 100 out of the printer once inserted. They are channel-shaped, having a long leg portion 108*a* similar to the positioning ribs, a middle portion or base 108*b* extending from one end of the long portion 108*a* around a small part of the circumference of the profile 66' and a short leg portion 108*c* running back across the width of the profile 66' from the end of the horizontal portion 108*b* distal from the long portion 108*a*. The leg portion 108*c* extends across approximately half the width of the profile 66'. The leg portion 108*c* forms an angle somewhat greater than a right angle with the horizontal portion 108*b* to facilitate smooth insertion of the cassette 100 into the printer.

Insertion of the cassette 100 in the printer will now be described with reference to FIGS. 17 and 18. The cassette 100 is inserted differently from the cassette 6 in that it is pushed into a cassette receiving bay 110 of the printer, rather than being received between two supports.

The cassette receiving bay 110 is shown in FIG. 17 without a cassette inserted. The cassette receiving bay 110 is generally cylindrical in shape, with a push-plate 112 at one end and open at the other end. Thus as shown in FIG. 17 the cassette 100 is to be inserted downwards onto the push-plate 112. The side of the generally cylindrical shape is formed of a locking ring shown generally by reference numeral 114. The inside surface of the locking ring 114 is visible in FIG. 17 and there can be seen two grooves 116 for receiving the positioning ribs 106 and three grooves 118 for receiving the fixation ribs 108. A fixed part of the cassette receiving bay sits behind the locking ring 114. In order to insert the cassette 100, the ribs 106, 108 and the grooves 116, 118 are aligned and the cassette 100 is pushed downwards such that each rib slides along its respective groove. The push-plate 112 is moveable and is therefore pushed downwards in FIG. 17 as the cassette 100 is inserted.

The locking ring 114 includes an exit slit for the tape 2 so that the tape 2 can exit the cassette receiving bay past the idler roller 104. This can be best seen in FIG. 18*a*, which shows an inserted cassette 100 which has pushed down the push-plate 112.

Figure 17A:
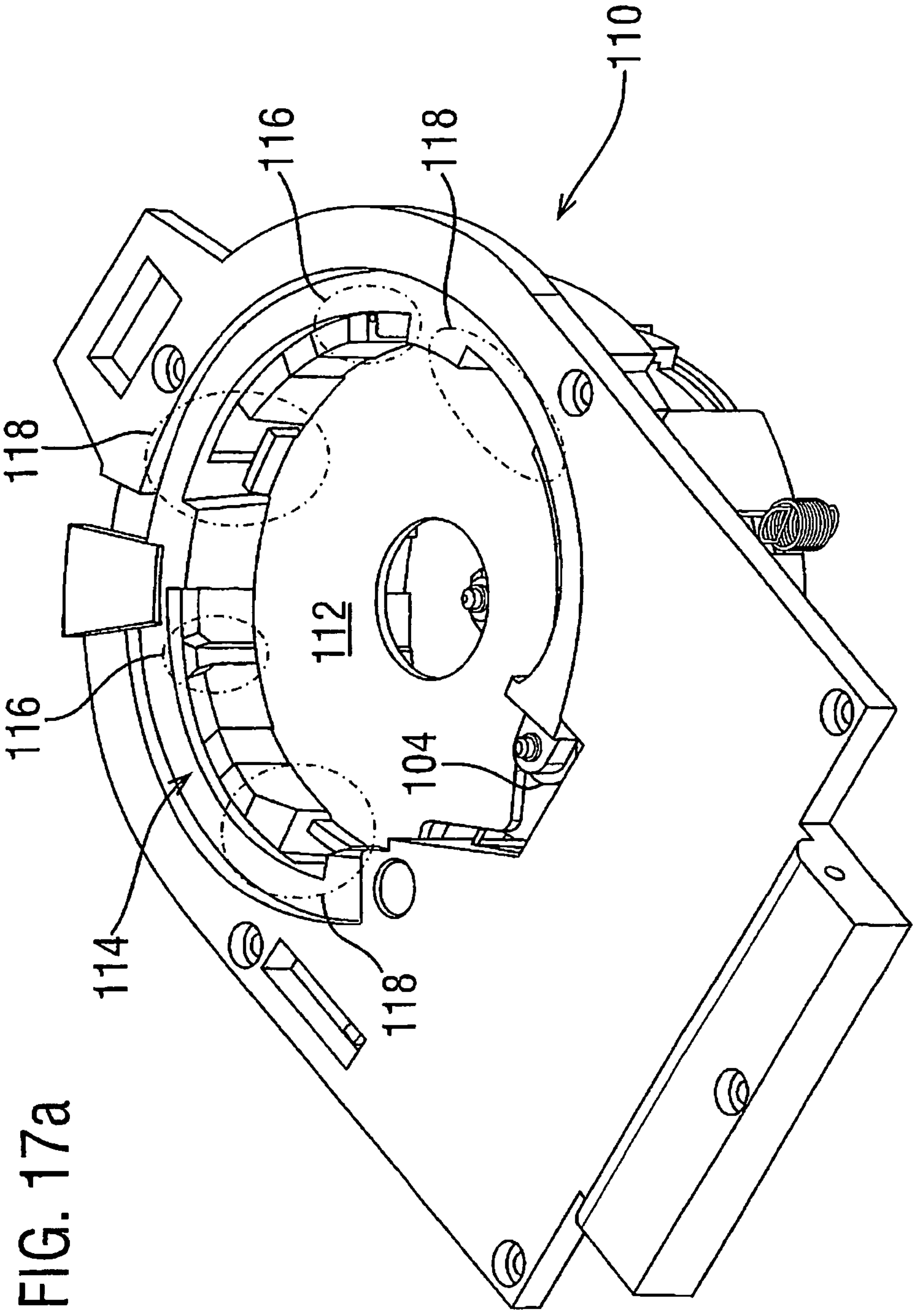
FIGS. 17*a* and 17*b* show a tape cassette receiving bay of a printer of the second embodiment.
Figure 17B:
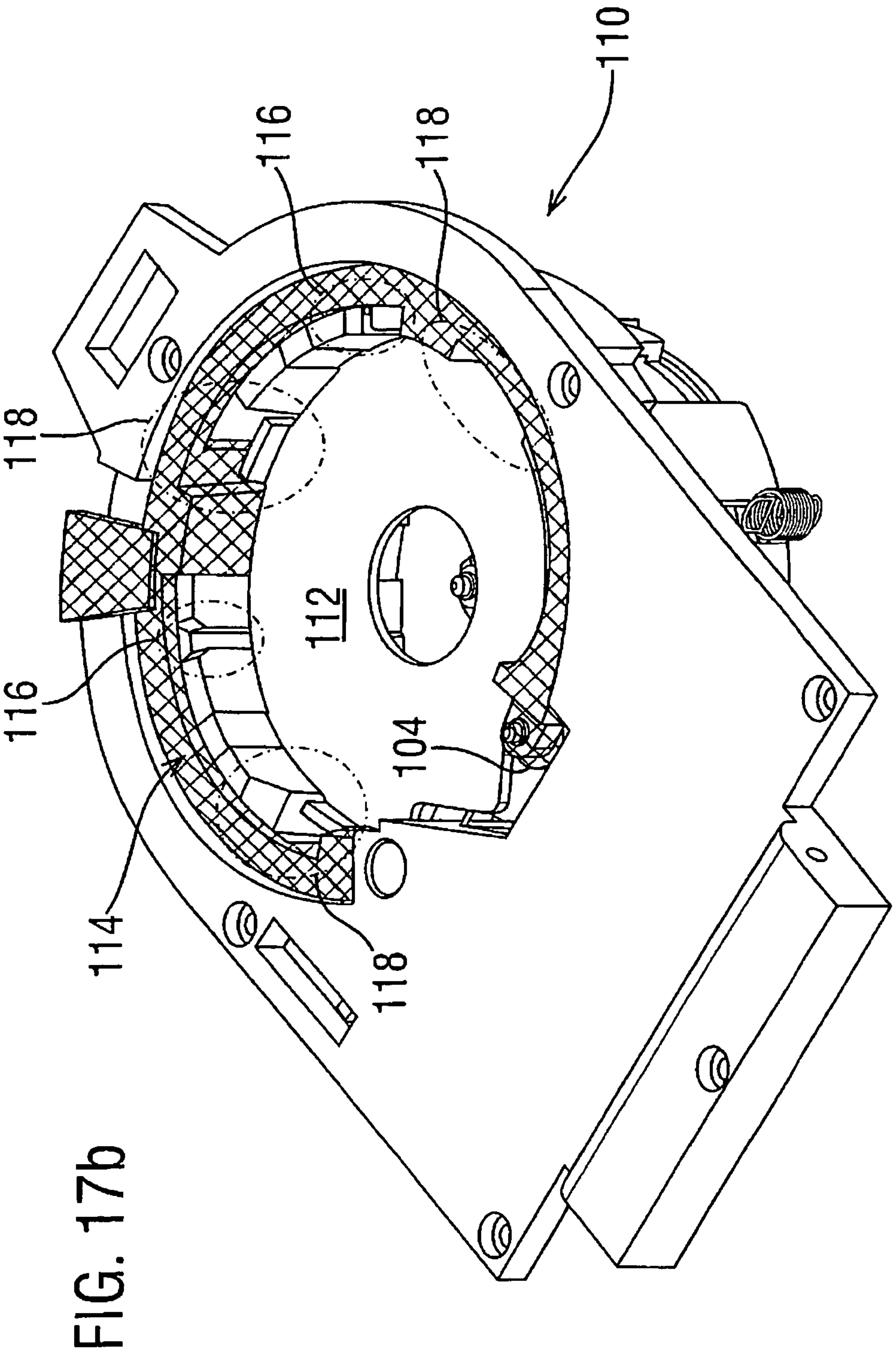

In FIGS. 17*a* and *b*, the locking ring 114 is shown in an open position in which the cassette 100 can be inserted. FIG. 17*b* is similar to FIG. 17*a* but shows the locking ring 114 hatched to distinguish it from other parts of the cassette receiving bay 110. In this position the grooves 116, 118 are open. The push-plate 112 will be pushed down a variable distance in dependence on the tape width and hence the width of the cassette 100. The push-plate 112 is connected to the locking ring 114 (they are conveniently formed from a single piece) and the locking ring is spring-loaded in a radial direction by a spring 120. Thus as a cassette 100 is pushed into place, the spring 120 tries to close the grooves 116, 118 by turning the ring 114 clockwise in FIGS. 17 and 18 with respect to fixed parts of the cassette receiving bay 110. However, the ring 114 can not be turned and hence the grooves 116, 118 can not be closed until the cassette 100 is fully inserted. This is because during insertion, the fixation ribs 108 hold the grooves 118 open. The cassette 100 is inserted with the base portion 108*b* of the fixation ribs 108 turned towards the push-plate 112. The angle of the leg portion 108*c* facilitates smooth insertion. Once the cassette is fully inserted, the fixation ribs 108 have cleared the grooves 118 and hence the spring 120 can act to turn the locking ring 114 to close the grooves 116, 118.

Figure 18A:
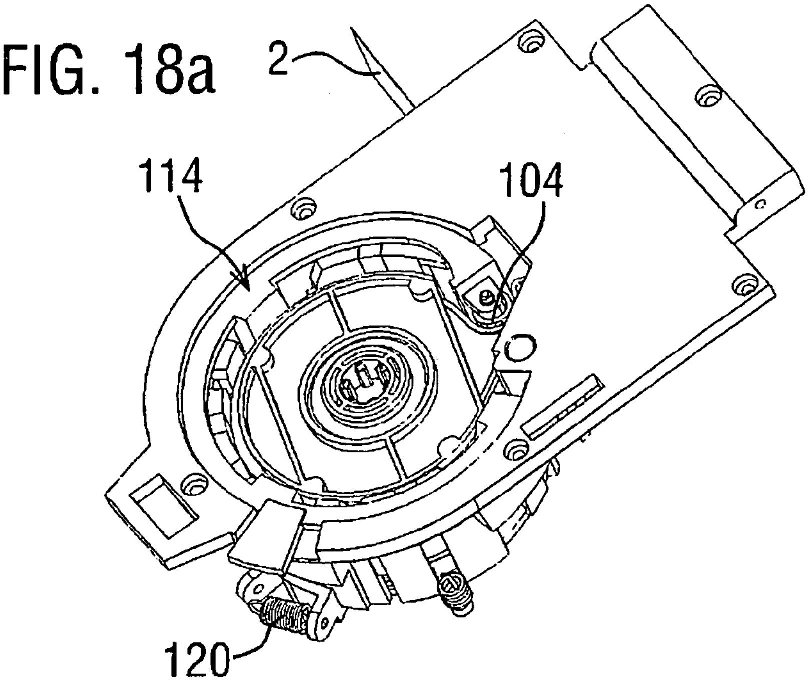
FIGS. 18*a* to 18*c* show the tape cassette of FIG. 15 inserted into the cassette receiving bay of FIGS. 17*a* and 17*b*.
Figure 18B:
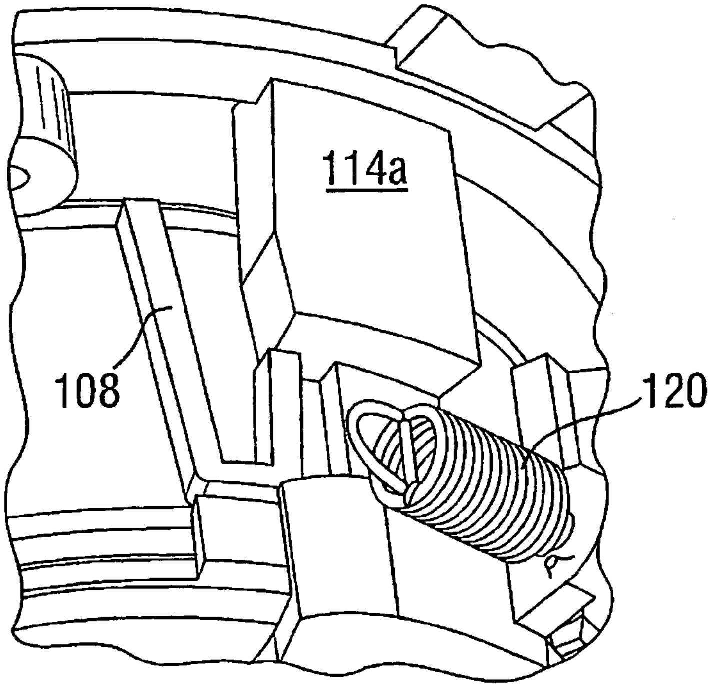
Figure 18C:
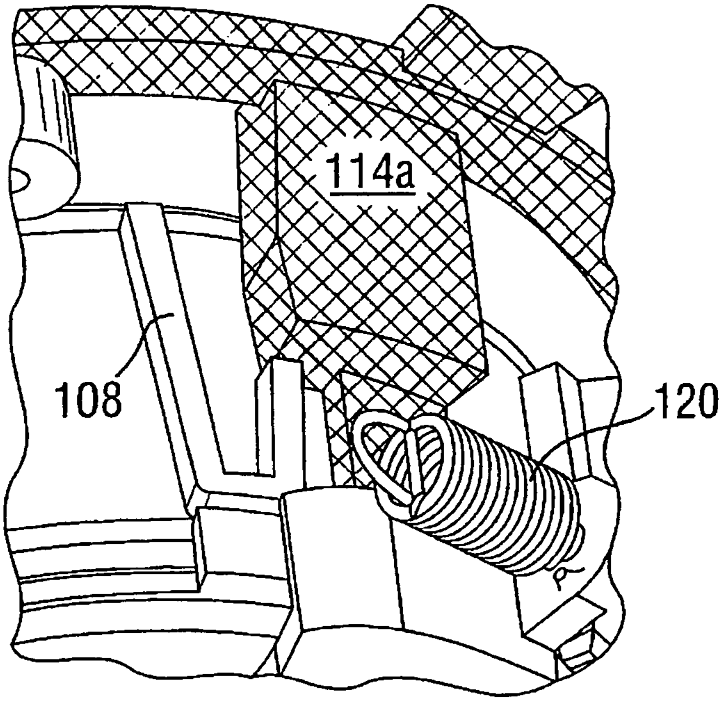

FIG. 18*a* shows a cassette 100 fully inserted and hence the grooves 116, 118 are no longer grooves because they have been closed. FIG. 18*b* shows the outside of the locking ring 114 and that one portion 114*a* of the locking ring 114 has slid over the top of the leg portion 108*c* of the fixation rib 108. Thus the leg portions 108*c* of the fixation ribs 108 abut on portions of the locking ring and hence prevent removal of the cassette 100 from the printer. This can be more clearly understood from FIG. 18*c* which is similar to FIG. 18*b* but shows the portions of the locking ring 114 hatched to distinguish them from other portions of the cassette receiving bay 110. When fully inserted, the cassette 100 is in the correct position for feeding of the tape 2 to the printhead. This is achieved for different widths of cassette because the push-plate 112 is moved different amounts for different cassettes by virtue of the fixation ribs 108 being correspondingly shorter or longer. Thus insertion of the cassette 100 using the ribs 106, 108 has ensured centring of the cassette 100 and hence the tape 2 with the printhead.

The cassette receiving bay 110 has a door (not shown) which is closed after insertion of a cassette 100 to cover the otherwise exposed top surface of the cassette. Closing the door moves the idler roller 104 into its working position in contact with tape 2 exiting the cassette 100.

In other embodiments, a separate lever is used to rotate the idler roller 104 into position. It is also possible for closure of the locking portion 114 to move the idler roller partially or fully into position. If it were only moved partially, a lever or the door could be used to complete the movement.

Figure 8A:
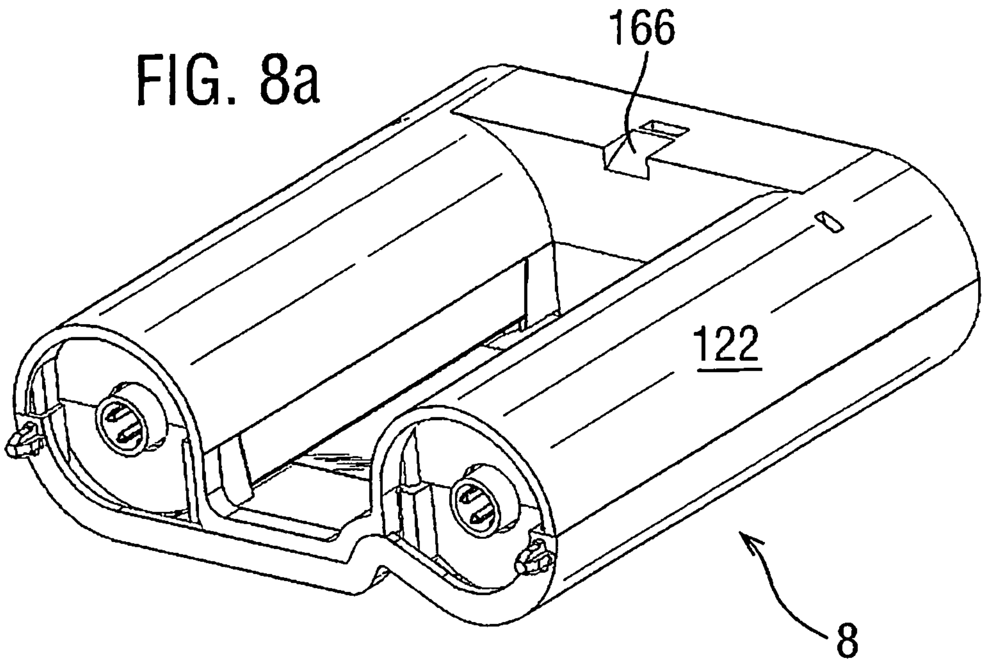
FIGS. 8*a* and 8*b* are two perspective views of a ink ribbon cassette.
Figure 8B:
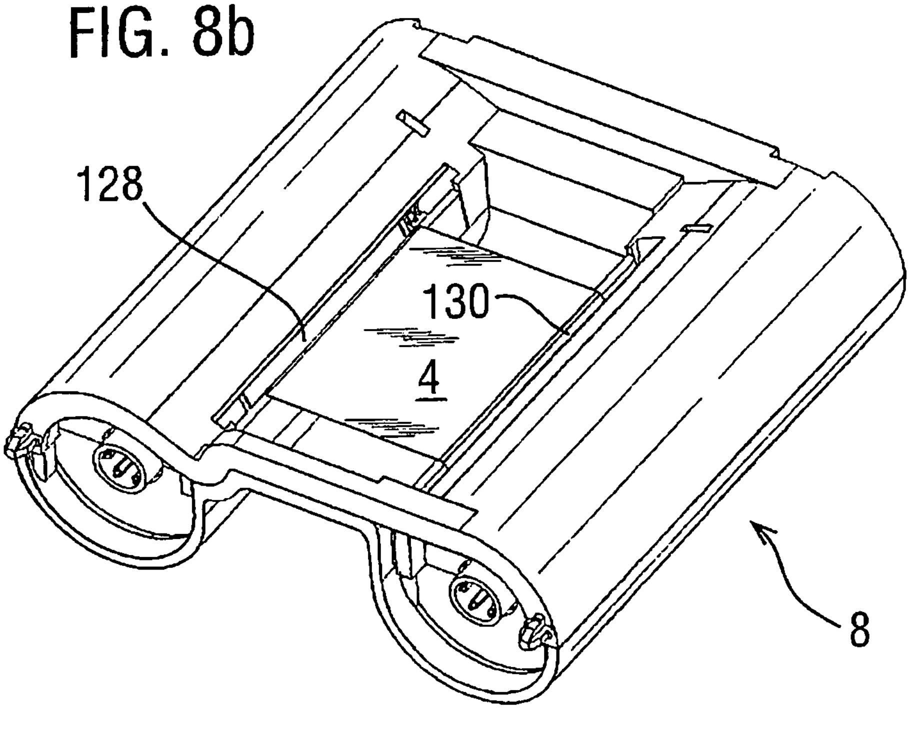

Further discussion of the ink ribbon cassette 8 will now be made, firstly with reference to FIGS. 8*a* and 8*b*. The ribbon cassette 8 is suitable for use with either of the printers of the first and second embodiments described above. FIG. 8*a* shows a top perspective view of the ink ribbon cassette 8 and FIG. 8*b* shows a bottom perspective view. Further reference is made to FIG. 19, which shows an exploded view of the ink ribbon cassette 8 to assist in explaining its construction.

The ink ribbon cassette 8 is constructed generally from a bottom part 120 and a cover part 122. Each of these parts comprises two half-cylinders joined together, so that when the parts 120, 122 are joined together, two cylinders are formed, one to house the supply reel 24 and the other to house the take-up reel 28. The supply reel 24 comprises a supply spool 124 and the take-up reel 28 comprises a take-up spool 126. The two half-cylinders of the cover part 122 are joined towards the widest part of the half-cylinders i.e. towards the bottom in FIGS. 8*a* and 19, such that when ink ribbon 4 emerges from the supply spool 124, it emerges from a slit 128 just above the join and is relatively protected by the two half-cylinders before it re-enters the cassette 8 through a second slit 130 to be taken up by the take-up spool 126. The ink ribbon 4 is used for printing as it passes through the region between the two cylinders.

Figure 19:
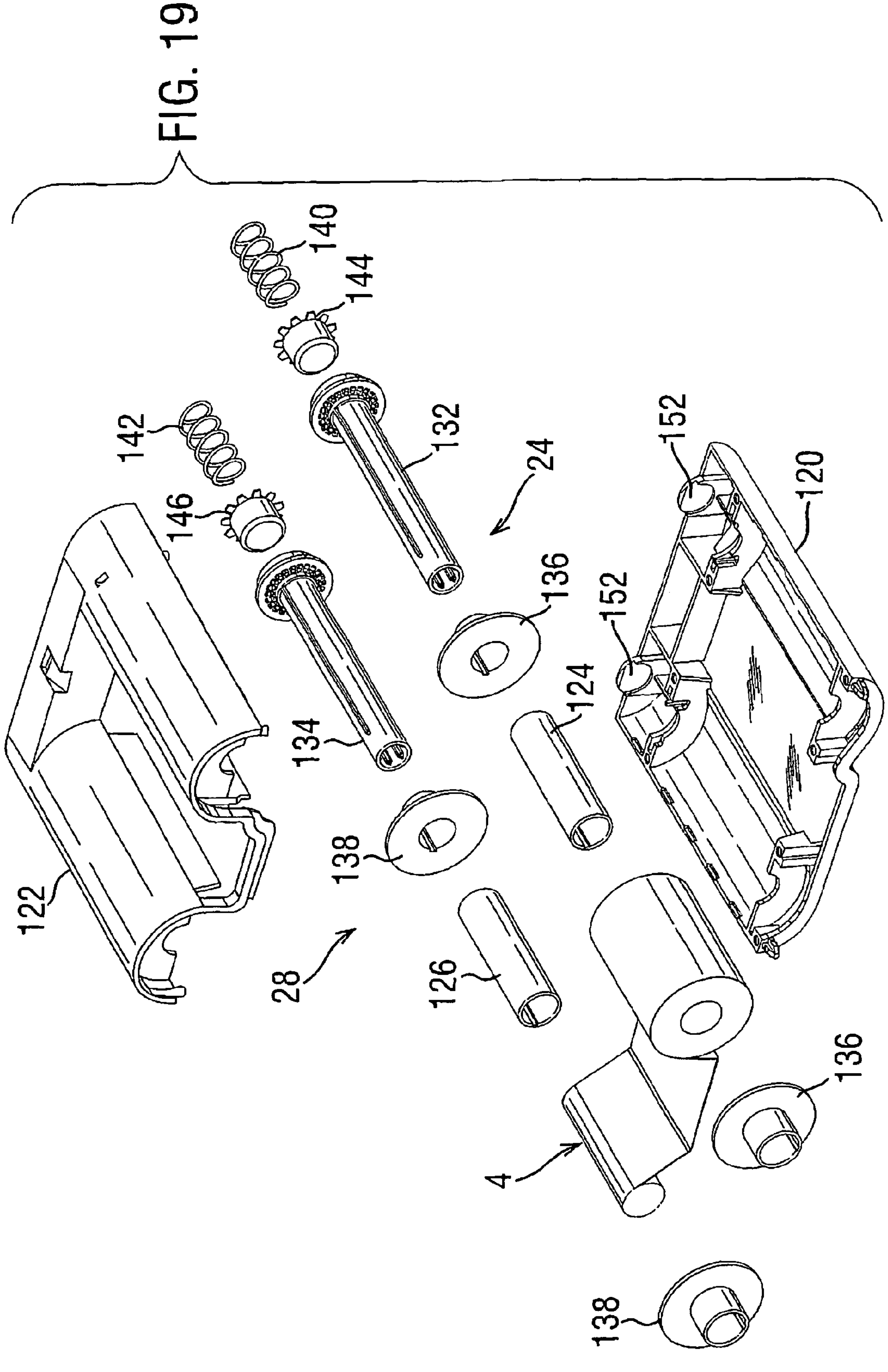
FIG. 19 shows an exploded view of the ink ribbon cassette of FIG. 8.

Other features of the ink ribbon cassette 8 that can be seen in FIG. 19 are a supply sprocket 132 and a take-up sprocket 134 which fit respectively inside the supply 124 and take-up 126 spools so as to enable driving of the spools, and a pair of spacers 136 either end of the supply spoof 124. A similar pair of spacers 138 is arranged to fit at either end of the take-up spool 126. There are also coil springs 140, 142 arranged respectively to act on the supply 132 and take-up 134 sprockets and having respective covers 144, 146 in which the springs are fitted. The purpose of the springs 140, 142 is to exert a constant force axially on the sprockets 132, 134, thereby maintaining ink ribbon tension. The end wall of the bottom portion 120 has flat or planar disc-shaped portions 152 onto which the other end of the springs 140, 142 bear. It would be possible to provide a single spring acting on only one of the sprockets but two springs provide better control over the ink ribbon tension.

Figure 20:
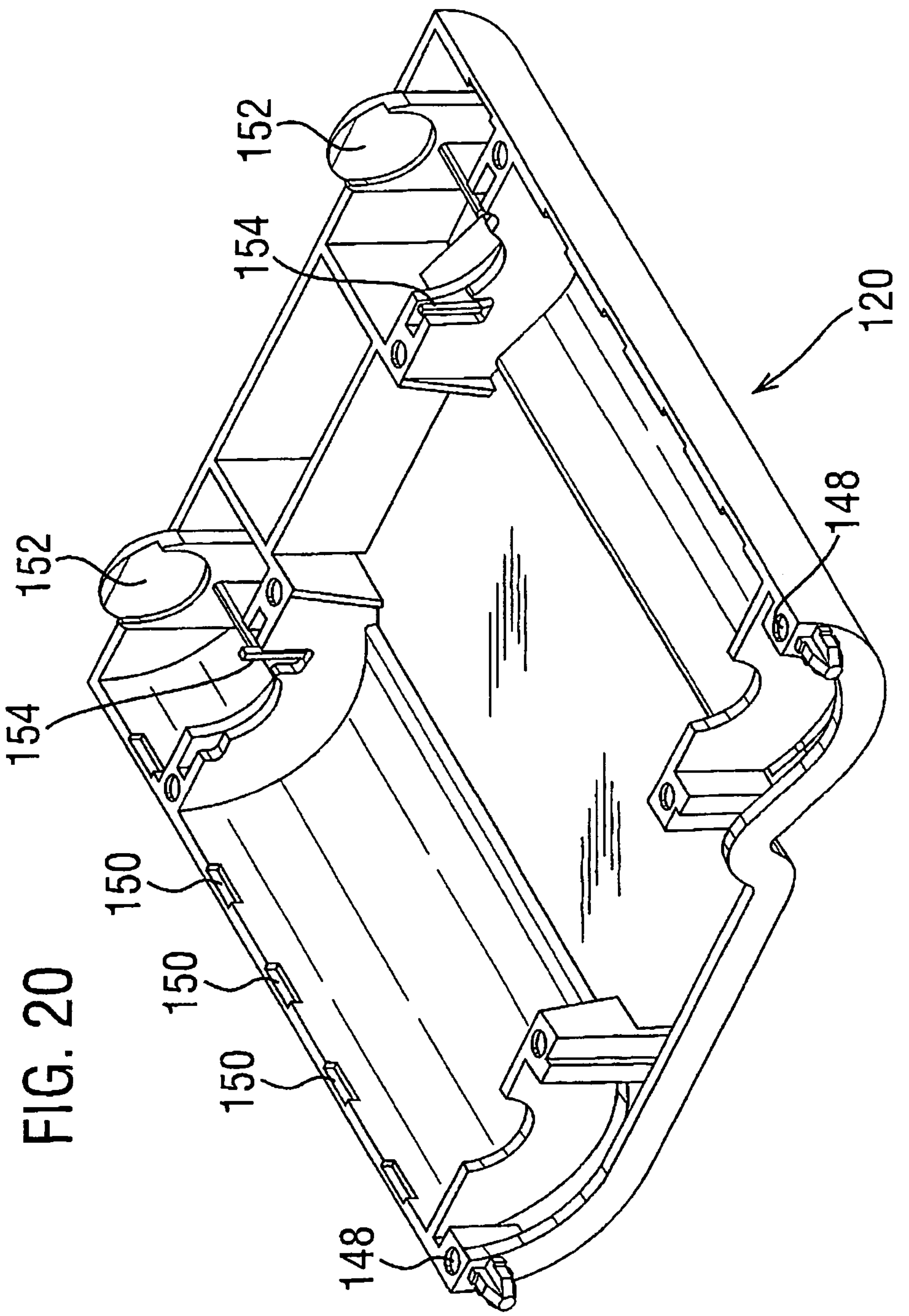
FIG. 20 shows the interior of a bottom portion of the ink ribbon cassette.

FIG. 20 shows in greater detail the bottom portion 120 of the ink ribbon cassette 8. Press fittings 148 for enabling press fitting of the bottom portion 120 with the cover 122 can be seen, and also a number of alignment ribs 150 to ensure accurate fitting with the cover. The flat spring supports 152 formed at one end of the bottom portion 120 are also visible. The ends of the springs 140, 142 rest on these supports to enable them to exert the necessary force on the sprockets 132, 134. Finally, two rewind brakes 154 can be seen in the region of the bottom portion 120 where the ends of the sprockets 132, 134 (where the springs make contact) reach to. These take the form of posts and there are two corresponding posts in the cover 122. Their purpose is to prevent unwinding of the ink ribbon 4 during transportation of the cassette 8.

Figure 21A:
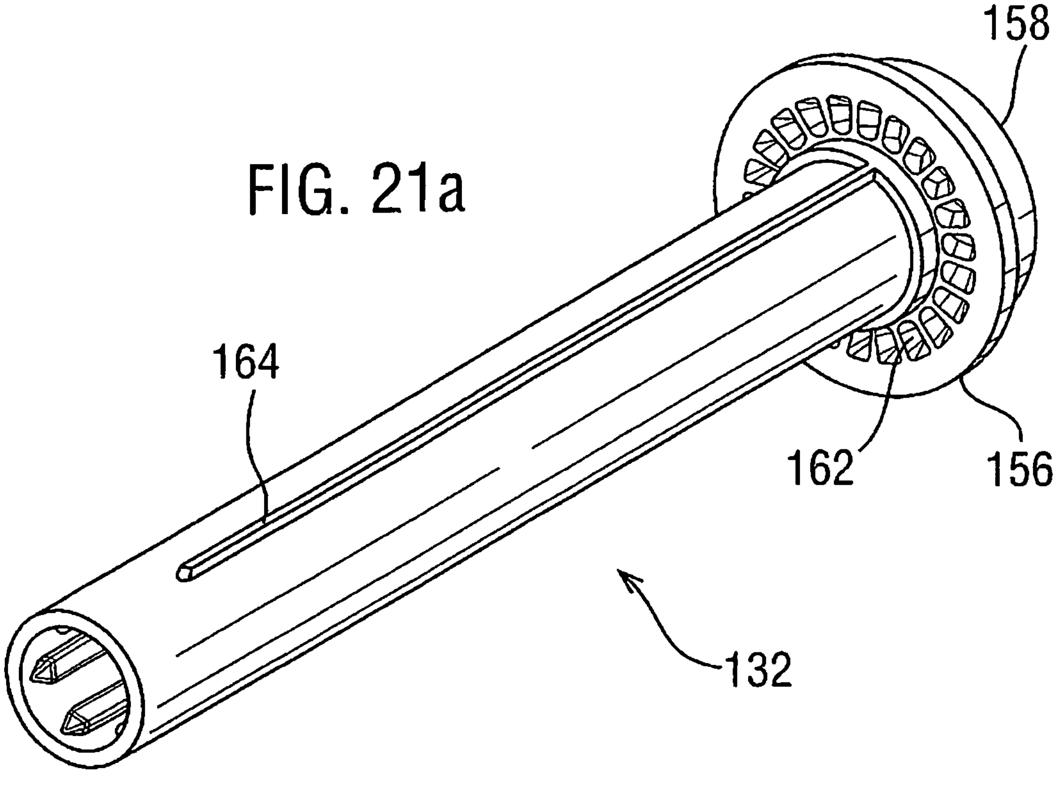
FIGS. 21*a* and 21*b* show two views of a sprocket of the ink ribbon cassette.
Figure 21B:
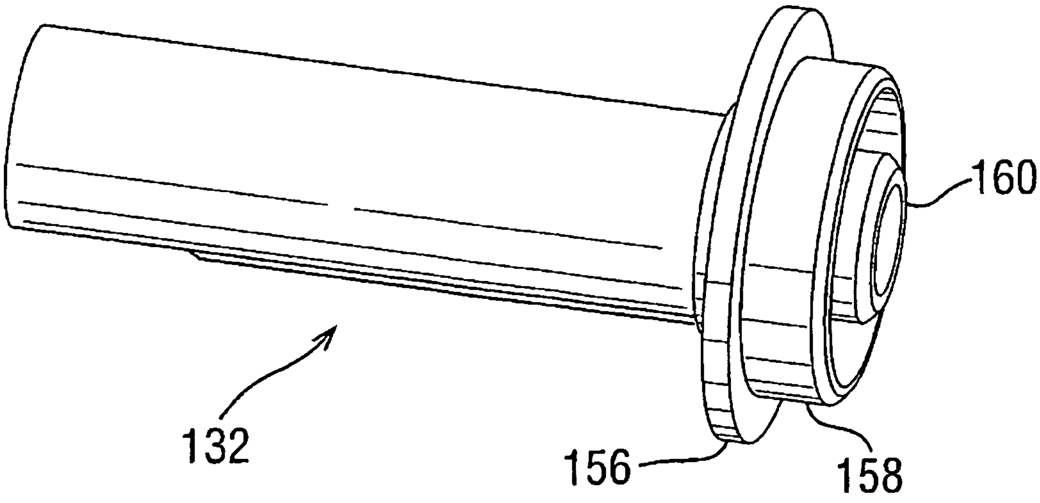

The action of the rewind brakes 154 can be better understood with reference to FIGS. 21*a* and 21*b* which show the unwind sprocket 132 (the rewind sprocket 134 is similar). It can be seen that the end of the sprocket 132 which contacts the spring 140 is formed of three cylinders, all of which have a greater diameter than the main body of the sprocket 132. The largest, inner cylinder 156 is a relatively flat disc and is located furthest from the spring contact point. This contains a series of openings 162 cut into the disc and arranged in a circular formation on the face which contacts the main body of the sprocket 132, located just outside the main body. The posts 154 fit into an opening 162, thereby holding the sprocket 132 such that it can not easily turn if the cassette 8 is subjected to vibration.

An anti-turn rib 164 runs along much of the length of the sprocket 132 and can be picked up by a corresponding recess on the interior of the spool 124 for positive engagement with the spool for rewinding the ink ribbon 4.

The other two cylinders, an outer cylinder 158 and an inner cylinder 160, form the end of the sprocket 132. The inner cylinder 160 sits inside the outer cylinder 158 but extends further out in the direction of the spring 140. This is to maintain a constant contact with the spring 140. The outer cylinder is used as a bearing surface onto the interior of the bottom portion 120 for the sprocket 132.

Reference is now made once again to FIG. 8*a*, together with FIGS. 22 and 23. It can be seen in FIG. 8*a* that the ink ribbon cassette 8 has a ramp 166 cut out of the upper surface of the cover portion 122 at the end where the springs 140, 142 are disposed, and roughly centralised between the supply and take-up cylinders. The centralised position is for balancing the forces during insertion and removal of the ink ribbon cassette 8 from the printer. The ramp 166 slopes upwards towards the end of the cassette 8.

Figure 22B:
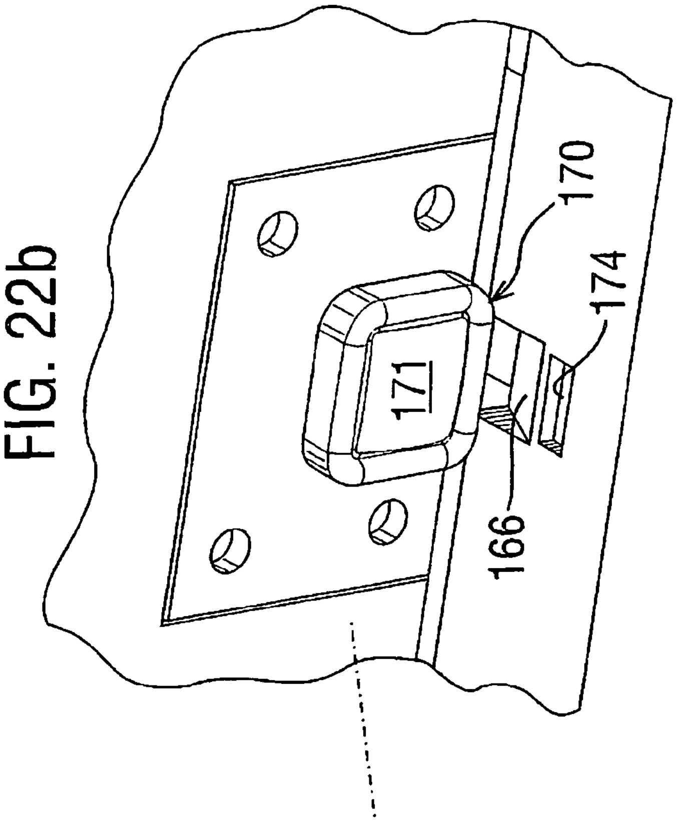
FIGS. 22*a* and 22*b* show insertion of the ink ribbon cassette into the printer.
Figure 22A:
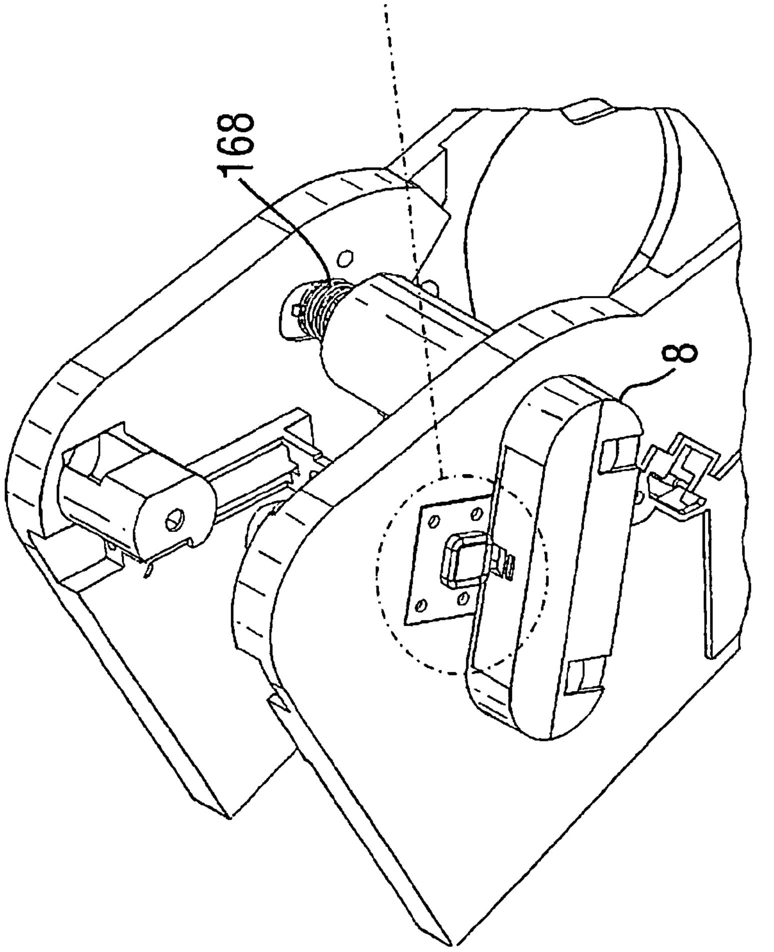

FIG. 22*a* shows the ink ribbon cassette 8 partially inserted into the printer. It is inserted non-ramp end first into a suitably-shaped recess, and is pushed in in a direction along the length of the spools 124, 126. The printer includes release springs 168 acting on each sprocket (only one is visible in FIG. 22*a*) and as the cassette is inserted, the printer sprockets of the shafts 22, 28 slide into the sprockets 132, 134 (not visible).

FIG. 22*b* shows an enlarged view of a lock 170 of the printer. This lock is designed to interact with the ramp 166. As can be seen in FIG. 23, the lock 170 includes a sprung button 172 which is resiliently moveable and which extends downwards in FIG. 22*b* so as to meet the ramp 166 as the cassette 8 is inserted. It can also be seen that as well as the ramp 166, the same face of the cassette 8 contains a slot 174 disposed just behind the ramp 166 (i.e. further away from the edge of the cassette 8) which is for receiving the button 172. It should be understood that the cassette 8 has a finite depth in the region of the ramp 166 and the slot 174, and that therefore the slot 174 extends through the material thickness of the cassette. However, this is not necessary because the button 172 is connected to a moveable centre portion 171 of the lock 170 which engages with the ink ribbon cassette 8 and which can conveniently be used to release the lock 170 as explained in the following paragraph.

Figure 23C:
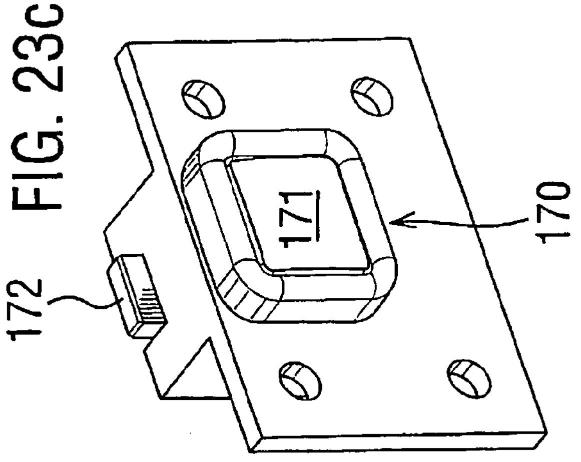
FIGS. 23*a-c* show a detail of a locking mechanism for locking the ink ribbon cassette in the printer.
Figure 23B:
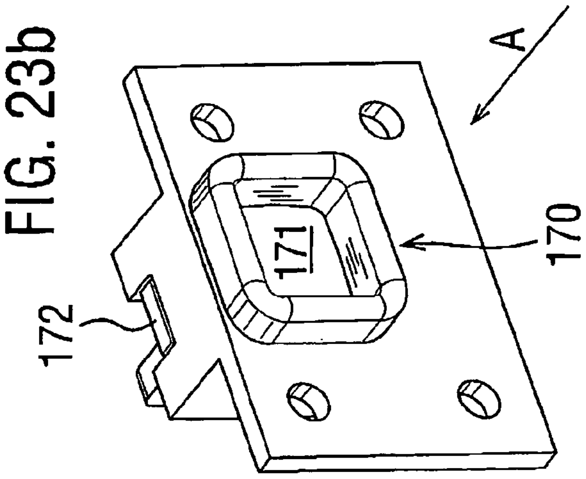
Figure 23A:
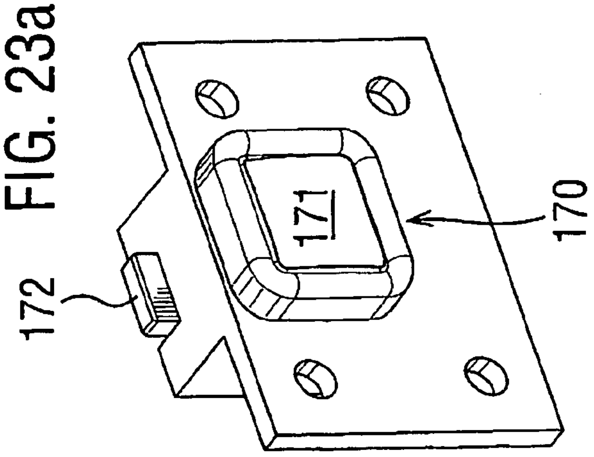

FIG. 23 shows three stages of insertion of the cassette 8 in the printer, and shows the lock 170 upside down as compared to FIG. 22. In FIG. 23*a*, the ramp 166 has not reached the lock and therefore the button 172 is sprung out. Thus if the cassette 8 did not have the ramp 166, it would not be possible to insert the cassette because the button 172 would prevent insertion. The centre portion 171 is in a position towards the front of the lock 170 i.e towards the exterior face of the printer. In FIG. 23*b* the cassette 8 is inserted in the direction of the arrow A and as the ramp 166 meets the button 172 it gradually pushes it upwards (downwards in the figure) until the button 172 reaches the flush position of FIG. 23*b* and the cassette clears the lock. The centre portion 171 has moved inwards with the button 172 i.e. towards the interior of the printer. In FIG. 23*c*, the cassette 8 is fully inserted and therefore the button 172 springs back out and enters the slot 174, such that it extends beyond the depth of the slot. The centre portion 171 has also returned to its original position. Thus the cassette 8 is locked in place in the printer.

In order to remove the cassette 8 from the printer, the centre portion 171 is pushed inwards, and the springs 168 then release the cassette 8.

It can be understood that the ramp and button mechanism would work equally well in reverse, i.e. with the printer bearing the ramp and slot and the cassette bearing the button.

Figure 24:
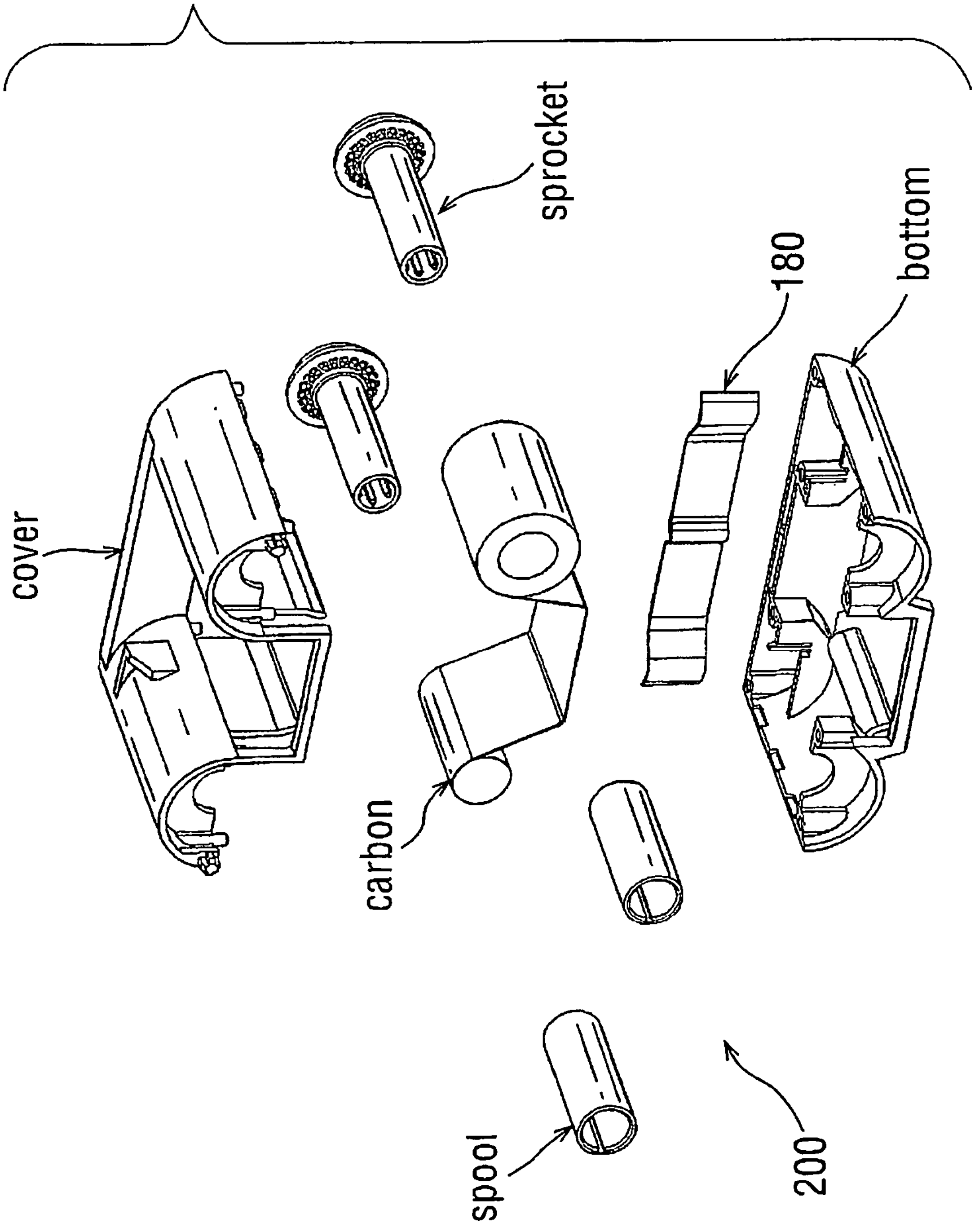
FIG. 24 shows an exploded view of an alternative ink ribbon cassette.
Figure 26:
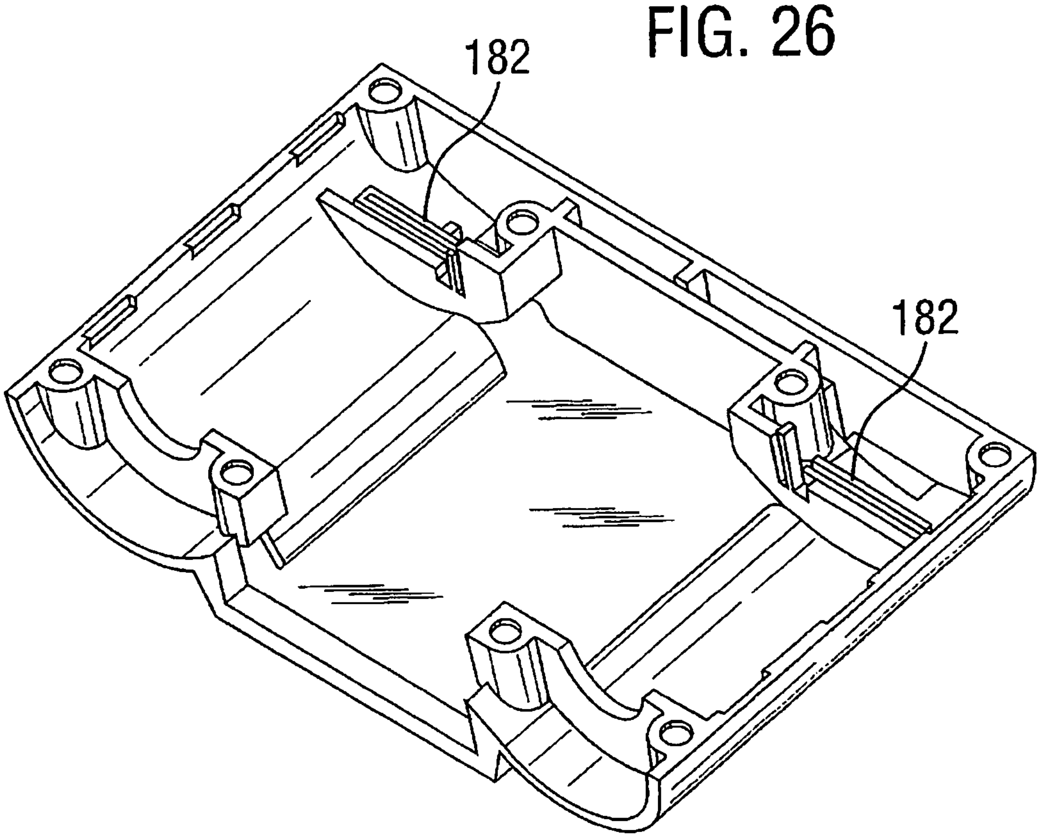
FIG. 26 shows a further view of a bottom portion of the ink ribbon cassette of FIG. 24 without an ink ribbon present.

Reference is now made to FIGS. 24 to 26 which show an alternative embodiment of an ink ribbon cassette, labelled generally with reference numeral 200. This ink ribbon cassette can be used with either of the two printer embodiments described above. The exploded view of FIG. 24 shows that this cassette has similar components to the ink ribbon cassette 8. One difference is a spring 180. This is a single, generally flat elongate spring that is provided in place of the springs 140, 142 of the ink ribbon cassette 8. FIG. 25*a* shows insertion of this spring into the bottom of the cassette such that two curved portions 180*a*, one disposed towards either end of the spring 180 can act on the ends of the sprockets. FIG. 25*b* shows the spring 180 inserted in the cassette 200. This spring has a similar effect to the springs 140, 142 in that it maintains ink ribbon tension. An advantage of using the spring 180 is that it enables the cassette 200 to be more compact than the cassette 8.

FIG. 26 shows the bottom portion of the cassette 200 without an ink ribbon present. It can be seen that towards one end of the bottom portion there are provided two sets of ribs 182 running across the bottom portion in the region of one end of where the ink ribbon and sprockets are to be located. These are for the outer cylinders 158 (see FIG. 21*b* with respect to the ink ribbon cassette 8) to bear on. Such ribs could be provided in the ink ribbon cassette 8.

Although in the above embodiments the example of a tape as a recording medium has been used, the invention and the described embodiments would work equally well with other types of recording medium, for example die-cut labels.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The foregoing detailed description has been provided solely to illustrate the structural and functional principles of the present invention, and is not intended to be limiting. To the contrary the present invention is intended to encompass all modifications, alterations, substitutions and equivalents within the spirit and scope of the following claims.

The invention claimed is:

1. A cassette for a recording medium comprising a casing, said casing comprising upper and lower casings and a side casing for joining the upper and lower casings, and said casing comprising a substantially central through-hole passing through said upper and lower casings, wherein one region of at least one of the upper and lower casings comprises on its exterior surface first and second ribs running in parallel and extending across a width of said at least one of the upper and lower casings either side of said central through-hole, which ribs are adapted to slide in a groove of a device in which the cassette can be inserted, each of the ribs comprising a projection that projects from said rib, said projection being elongate in a direction of said rib, said projection adapted to latch into a detent of a device in which the cassette can be inserted.

2. A cassette comprising a hollow spool for holding a recording medium, said cassette further comprising a sprocket disposed inside at least a part of the spool and driveable to rotate the spool for unwinding recording medium therefrom, wherein a surface of the sprocket in contact with an interior surface of the spool comprises a plurality of protrusions which bear on the inside surface of the spool to provide an interference fit the spool, said cassette comprising an upper casing and a lower casing, said spool for holding a roll of recording medium being disposed between the upper and lower casings, and a side casing for enclosing the spool and joining the upper and lower casings, wherein the side casing is fitted to at least one of the upper and lower casings by press-fit or snap-fit connections, wherein the upper and lower casings and the spool each have a substantially central through-hole which are substantially aligned as between the parts; said sprocket being disposed in the through hole of one of the upper and lower casings and dimensioned to extend into the through hole in the spool for rotating the spool.

3. A cassette according to claim 2, wherein the upper and lower casings comprise grooves and/or protrusions and the side casing comprises corresponding protrusions and/or grooves for effecting the press-fit or snap-fit connections.

4. A cassette according to claim 2, wherein the upper and lower casings and the side casing have a generally circular configuration, and comprise an exit area through which a recording medium disposed on the spool can exit.

5. A cassette for use with a printer, the cassette comprising a body having a base portion, a top portion, and a side portion extending from the base portion to the top portion, the body housing a roll of print receiving medium having an axis of rotation extending in a first direction from the base portion to the top portion, said cassette comprising one or more ribs on an outside surface of the side portion of the cassette, at least one of the ribs being substantially channel-shaped, wherein at least one of the legs of the channel-shape is disposed at an angle of greater than 90 degree to a rib forming a base of the channel-shape.

6. An ink ribbon cassette comprising: a supply spool for holding a roll of ink ribbon; a take-up spool onto which ink ribbon unwound from the supply spool is wound; a driveable sprocket arranged to rotate the supply spool about an axis of the supply spool for rewinding unwound ribbon onto the supply spool; and a spring disposed to act on the sprocket in the direction of said axis for maintaining tension of the ink ribbon between the supply and take-up spools.

7. An ink ribbon cassette comprising: a hollow supply spool for holding a roll of ink ribbon; and a driveable sprocket at least part of which is disposed inside the supply spool to rotate the supply spool for rewinding unwound ribbon onto the supply spool, wherein the end of the sprocket that is not disposed inside the supply spool comprises an inner cylinder and an outer cylinder, the inner cylinder extending further in an axial direction away from the supply spool than the outer cylinder so as to bear against a biasing element of the ink ribbon cassette, wherein the outer cylinder comprises a bearing surface for bearing the driveable sprocket against a surface of the cassette.

* * * * *

UNITED STATES PATENT AND TRADEMARK OFFICE

CERTIFICATE OF CORRECTION

PATENT NO. : 8,529,050 B2
APPLICATION NO. : 10/540541
DATED : September 10, 2013
INVENTOR(S) : Vandermeulen It is certified that error appears in the above-identified patent and that said Letters Patent is hereby corrected as shown below:

On the Title Page, in Item (57), under "ABSTRACT", in Column 2, Line 3, delete "disposed the" and insert -- disposed between the --, therefor.

On the Title Page, in Item (57), under "ABSTRACT", in Column 2, Line 7, delete "press fit" and insert -- press-fit --, therefor.

In the Claims:

In Column 17, Line 51, in Claim 2, delete "fit the" and insert -- fit with the --, therefor.

Signed and Sealed this
Twenty-fourth Day of February, 2015

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,529,050 B2
APPLICATION NO. : 10/540541
DATED : September 10, 2013
INVENTOR(S) : Kris Vandermeulen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1979 days.

Signed and Sealed this
Fifteenth Day of September, 2015

Michelle K. Lee

Michelle K. Lee
*Director of the United States Patent and Trademark Office*